United States Patent
Wayans

(10) Patent No.: US 10,943,062 B2
(45) Date of Patent: Mar. 9, 2021

(54) METHOD AND APPARATUS OF IMPLEMENTING BUSINESS CARD APPLICATION

(71) Applicant: Aniya's Production Company, Los Angeles, CA (US)

(72) Inventor: Damon Wayans, Los Angeles, CA (US)

(73) Assignee: Aniya's Production Company, Los Angeles, CA (US)

( * ) Notice: Subject to any disclaimer, the term of this patent is extended or adjusted under 35 U.S.C. 154(b) by 0 days.

(21) Appl. No.: 14/683,034

(22) Filed: Apr. 9, 2015

(65) Prior Publication Data
US 2015/0293893 A1    Oct. 15, 2015

Related U.S. Application Data

(60) Provisional application No. 61/978,140, filed on Apr. 10, 2014.

(51) Int. Cl.
    *G06F 40/174*      (2020.01)
    *G06Q 10/10*      (2012.01)
    *G06F 3/0488*      (2013.01)

(52) U.S. Cl.
    CPC ........... *G06F 40/174* (2020.01); *G06Q 10/10* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 2002/0188523 A1* | 12/2002 | Hyyppa | ................. | G06Q 20/00 705/26.41 |
| 2005/0076013 A1* | 4/2005 | Hilbert | .................. | G06Q 10/10 |
| 2013/0047115 A1* | 2/2013 | Migos | .................. | G06F 17/241 715/776 |
| 2013/0073990 A1* | 3/2013 | Park | ........................ | G06Q 50/01 715/758 |
| 2013/0083219 A1* | 4/2013 | Heo | .................... | H04N 5/23216 348/231.6 |
| 2013/0145295 A1* | 6/2013 | Bocking | ................. | G06F 3/017 715/764 |
| 2013/0174081 A1* | 7/2013 | Yoon | ..................... | G06F 3/0481 715/773 |
| 2013/0198277 A1* | 8/2013 | Pedregal | ............ | G06Q 30/0282 709/204 |
| 2013/0298060 A1* | 11/2013 | Hoyer | .................... | G06F 3/0486 715/769 |
| 2014/0181734 A1* | 6/2014 | Jin | ...................... | G06F 3/04883 715/786 |
| 2014/0191983 A1* | 7/2014 | Choi | ..................... | G06F 3/0412 345/173 |

(Continued)

*Primary Examiner* — Toan H Vu

(57) ABSTRACT

A device and method are presently disclosed. The computer implemented method, includes an electronic device with a touch-sensitive display, displaying a representation of a blank card on the touch-sensitive display, detecting user's first finger contact with the touch-sensitive display, in response to detecting the user's first finger contact, displaying a field on the representation of the blank card, detecting user's second finger contact with the touch-sensitive display, and in response to detecting the user's second finger contact adjusting position or dimensions of the field on the representation of the blank card.

7 Claims, 32 Drawing Sheets

(56) References Cited

U.S. PATENT DOCUMENTS

| | | | |
|---|---|---|---|
| 2014/0380229 A1* | 12/2014 | Volodin | G06F 3/04842 715/780 |
| 2015/0100868 A1* | 4/2015 | Moore | G06F 17/30905 715/205 |
| 2015/0135127 A1* | 5/2015 | Patel | G06F 3/04842 715/781 |
| 2015/0153924 A1* | 6/2015 | Felt | G06F 3/0482 715/765 |
| 2015/0199320 A1* | 7/2015 | Ho | G06F 3/017 715/233 |
| 2015/0286361 A1* | 10/2015 | Puri | H04W 4/21 715/719 |
| 2015/0382181 A1* | 12/2015 | Chen | G06F 1/1698 455/418 |

* cited by examiner

METHOD AND APPARATUS OF IMPLEMENTING BUSINESS CARD APPLICATION

CROSS REFERENCE TO RELATED APPLICATIONS

This application is related to U.S. application Ser. No. 13/777,647, filed on Feb. 26, 2013, which is incorporated herein by reference in its entirety. This application claims the benefit of U.S. Provisional Application No. 61/978,140, filed on Apr. 10, 2014, which is incorporated herein by reference in its entirety.

FIELD

The present invention relates to electronic devices. More particularly, the present invention relates to sharing information using electronic devices.

BACKGROUND

In recent years, tablet computers, smartphones, and similar devices have become very popular. These devices frequently include touch screens, via which users can interact with virtual objects using intuitive gestures.

People, and particularly business people, are constantly on the move and their smartphones, tablet computers, and similar devices provide their constant connection to their respective lives and community. An advantageous device to device exchange of virtual information that may be initiated using a swiping gesture is described herein.

Figure 1A:
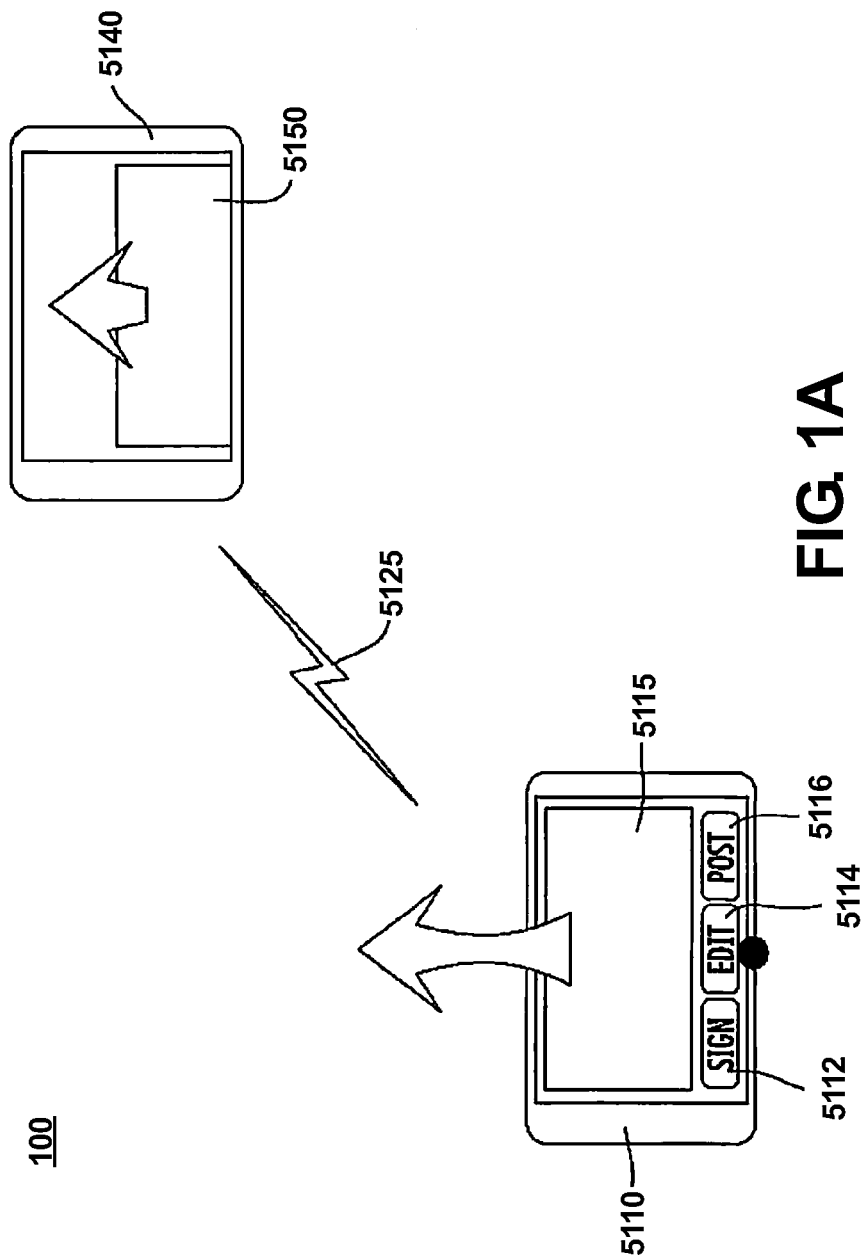
FIG. 1a illustrates a system in which a first computing device delivers a business card to a second computing device.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

According to some embodiments, a method and apparatus for implementing a business card application is presently disclosed. According to some embodiments, presently disclosed application may be virtual allowing users to exchange their virtual business cards using their respective computing devices by initiating the exchange using a swiping gesture. This exchange of information may occur when the users are proximate or remote from one another. According to some embodiments, presently disclosed application may allow for distributing and storing of virtual business cards. Receivers and senders may be linked by the application, in an application to application fashion, to make a direct exchange. According to some embodiments, a connection to the application is all that is needed to organize and exchange cards. According to some embodiments, presently disclosed application may provide a "whoosh" or sliding sound when sending and/or receiving cards.

According to some embodiments, presently disclosed system includes a first computing device that includes information that is displayed on the screen of the first computing device, the first computing device scanning for a connection point and prompting for selection of a plurality of second devices to receive the information, wherein once ones of the plurality of second devices are selected, a user initiates the delivery of the information from the first computing device to the selected ones of the plurality of second devices by interacting with the first computing device. A user initiates the transfer of the information with a flick across the screen of the first computing device. The information is a business card.

The method of delivering information from a first computing device to at least one of a plurality of second computing devices includes creating information on the first computing device, scanning for a connection point, selecting at least one of a plurality of second devices to receive the information from the first computing device, selecting information to send from the first computing device to the selected at least one of the plurality of second computing devices, and delivering the information. The method may include adding a signature to the information prior to initiating delivery of the information and notifying at least one of the plurality of second computing devices to the received information.

FIG. 1a illustrates a system 100 in which a first computing device 5110 delivers a virtual business card to a second computing device 5140. The virtual business card 5115 is illustrated on first computing device 5110. In some embodiments, business card 5115 contains information which may be about the user or owner of first computing device 5110 and/or about any other third party. System 100 allows the user of first computing device 5110 to deliver business card 5115 to second computing device 5140. In some embodiments, once business card 5115 is received by second computing device 5140, business card 5115 may take the form of business card 5150. In some embodiments, upon receipt, business card 5150 may slide onto second computing device 5140. This delivery by sliding onto the device may be represented as the business card 5150 slides across the screen of the second computing device 5140. As similar sliding may occur as the business card 5115 departs from the first computing device 5110. That is, sending of information from first computing device 5110 may appear to slide off of the screen of first computing device 5110 and receiving of information at second computing device 5140 may provide the appearance that the information is sliding onto the screen of the second computing device 5140.

First computing device 5110 may be a tablet computer, a television, a projecting display, a display coupled with the stock computer, a display coupled to a laptop computer, or even a portable computing device, such as, for example, the Smartphone. Second computing device 5140 may be any one of the types of computer devices identified for the first computing device. Generally first and second computing devices 5110, 5140 may be, for example, a portable computing device that may be hand-held, such as a smart phone or iPhone, and MP3 player having an interactive display or an iPod, or tablet computer or iPad.

In addition, first computing (i.e. electronic) device 5110 is depicted as a single computing device with a single display. This is done for ease of description and understanding of the present application.

Figure 1B:
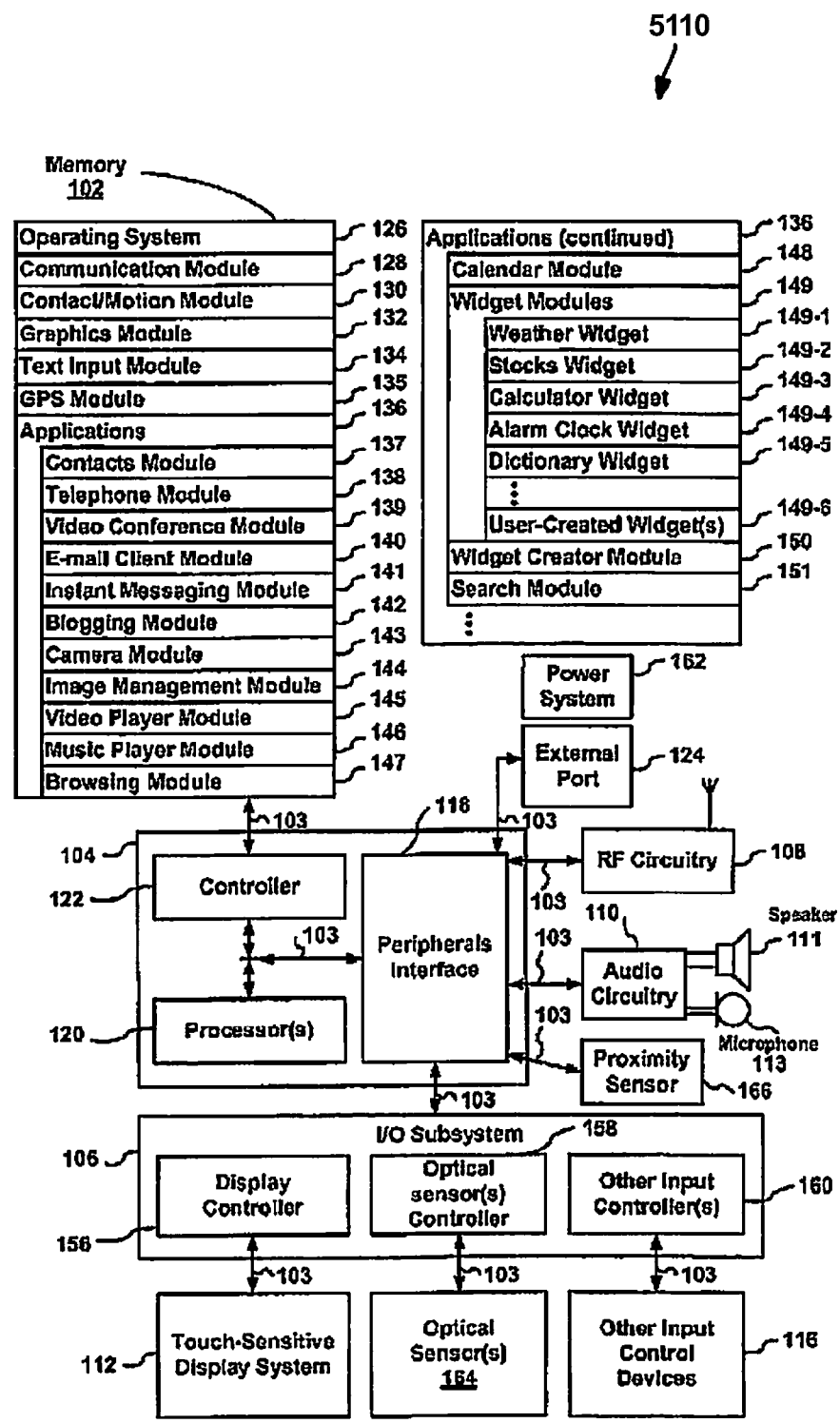
FIG. 1b depicts a block diagram of a device as known in the art.

The electronic device 5110 is shown in FIG. 1b. According to some embodiments, the computing device 5140 comprises at least some of the same features as shown/described with respect to the device 5110 below. According to some embodiments, the device 5110 may comprise a memory 102 (which may comprise one or more computer readable storage mediums), an input/output (I/O) subsystem 106, a memory controller 122, one or more processing units (CPU's) 120, a peripherals interface 118, an audio circuitry 110, a speaker 111, a microphone 113, and one or more optical sensors 164 in accordance with some embodiments. These components may communicate over one or more communication buses or signal lines 103.

The memory 102 may comprise high-speed random access memory and/or non-volatile memory, such as one or more magnetic disk storage devices, flash memory devices, or other non-volatile solid-state memory devices. Access to memory 102 by other components of the device 5110, such as the CPU 120 and the peripherals interface 118, may be controlled by the memory controller 122.

The peripherals interface 118 couples the input and output peripherals of the device 5110 to the CPU 120 and memory 102. The one or more processors 120 run or execute various software programs and/or sets of instructions stored in memory 102 to perform various functions for the device 5110 and to process data. The peripherals interface 118, the CPU 120, and the memory controller 122 may be implemented on a single chip, such as a chip 104. In some other embodiments, they may be implemented on separate chips.

The audio circuitry 110, the speaker 111, and the microphone 113 provide an audio interface between a user and the device 5110. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 by the peripherals interface 118. The audio circuitry 110 may also comprise a headset/speaker jack (not shown). The headset jack provides an interface between the audio circuitry 110 and removable audio input/output peripherals, such as speaker, output-only headphones and/or a headset with both output (e.g., a headphone for one or both ears) and input (e.g., a microphone).

The device 5110 may further comprise a touch-sensitive display 112, other input or control devices 116, radio frequency (RF) circuitry 108, and/or an external port 124 in accordance with some embodiments. These components may also communicate over one or more communication buses or signal lines 103.

As known in the art, the device 5110 as shown in FIG. 1*b* may comprise more or fewer components than shown, may combine two or more components, or a may have a different configuration or arrangement of the components. The various components shown in FIG. 1*b* may be implemented in hardware, software or a combination of both hardware and software, including one or more signal processing and/or application specific integrated circuits.

In one embodiment, the device 5110 is a cellular phone. In another embodiment, the device 5110 is a video camera. In another embodiment, the device 5110 is a camera. In another embodiment, the device 5110 is a video camera. In another embodiment, the device 5110 is a computer. In another embodiment, the device 5110 is a portable computer. In another embodiment, the device 5110 is a tablet.

The device 5110 may also comprise a radio frequency (RF) circuitry 108. The RF circuitry 108 may be configured to receive and transmit RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The I/O subsystem 106 couples input/output peripherals on the device 5110, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include one or more physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (not shown) may include an up/down button for volume control of the speaker 111 and/or the microphone 113.

The touch-sensitive display 112 is sometimes called a "touch screen" for convenience, and may also be known as or called a touch-sensitive display system. In one embodiment, the touch-sensitive touch screen 112 provides an input interface and an output interface between the device 5110 and a user. The touch screen 112 is configured to implement virtual or soft buttons and one or more soft keyboards. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

The touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In one embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 5110, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution of 100 dpi to 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In addition to the touch screen 112, the device 5110 may comprise a touchpad (not shown) for activating or deactivating particular functions. The touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

The device 5110 may also comprise a physical or virtual click wheel (not show) as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 5110 may further comprise a power system 162 for powering the various components. The power system 162 may comprise a power management system, one or more power sources (e.g., battery, alternating current (AC)), a recharging system, a power failure detection circuit, a power converter or inverter, a power status indicator (e.g., a light-emitting diode (LED)) and/or any other components associated with the generation, management and distribution of power in portable devices.

The optical sensor 164 of the device 5110 may be electrically coupled with an optical sensor controller 158 in I/O subsystem 106. The optical sensor 164 may comprise charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture visual media (i.e. still images or video). In some embodiments, the optical sensor 164 may be located on the back of the device 5110, opposite the touch screen display 112 on the front of the device 5110, so that the touch screen display 112 may be used as a viewfinder for either still and/or video image acquisition. In some embodiments, the optical sensor 164 may be located on the front of the device 5110 to capture image(s) of the user. In some embodiments, one optical sensor 164 may be located on the back of the device 5110 and another optical sensor 164 may be located on the front of the device 5110. In some embodiments, the position of the optical sensor 164 may be changed by the user (e.g., by rotating the lens and the sensor in the device housing) so that a single optical sensor 164 may be used along with the touch screen display to capture still and/or video image.

The device 5110 may also comprise one or more accelerometers 168. FIG. 1*b* shows an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. Information may be displayed on the touch screen display 112 in a portrait view or a landscape view based on an analysis of data received from the one or more accelerometers 168.

As known in the art, the memory 102 may be configured to store one or more software components as described below.

The memory 102 may be configured to store an operating system 126. The operating system 126 (e.g., Darwin, RTXC, LINUX, UNIX, OS X, WINDOWS, or an embedded operating system such as VxWorks) comprises various software components and/or drivers for controlling and managing general system tasks (e.g., memory management, storage device control, power management, etc.) and facilitates communication between various hardware and software components.

The memory 102 may also be configured to store a communication module 128. The communication module 128 facilitates communication with other devices over one or more external ports 124 and also includes various software components for handling data received by the RF circuitry 108 and/or the external port 124. In one embodiment, the external port 124 (e.g., Universal Serial Bus (USB), FIREWIRE, etc.) is configured for coupling directly to other devices or indirectly over a network (e.g., the Internet, wireless LAN, etc.).

The memory 102 may be configured to store a contact/motion module 130. The contact/motion module 130 is configured to detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 130 and the display controller 156 may also detect contact on a touchpad. The contact/motion module 130 and the controller 160 may further detect contact on a click wheel.

The memory 102 may be configured to store a graphics module 132. The graphics module 132 comprises various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The memory 102 may also be configured to store a text input module 134. The text input module 134, which may be a component of graphics module 132, provides soft keyboards for entering text in various applications that need text input.

The memory 102 may be configured to store a GPS module 135. The GPS module 135 determines the location of the device and provides this information for use in various applications (e.g., to camera module 143 as picture/video metadata).

The memory 102 may be configured to store applications 136. The applications 136 may comprise one or more of the following modules (or sets of instructions), or a subset or superset thereof: a camera module 143 for still and/or video images; an image management module 144; a video player module 145; a music player module 146; and/or online video module 155.

As known in the art, applications 136 may comprise additional modules (or sets of instructions). For example, other applications 136 that may be stored in memory 102 may include one or more of the following: a contacts module 137 (sometimes called an address book or contact list); a telephone module 138; a video conferencing module 139; an e-mail client module 140; an instant messaging (IM) module 141; a blogging module 142; a browser module 147; a calendar module 148; widget modules 149, which may include weather widget 149-1, stocks widget 149-2, calculator widget 149-3, alarm clock widget 149-4, dictionary widget 149-5, and other widgets obtained by the user, as well as user-created widgets 149-6; widget creator module 150 for making user-created widgets 149-6; search module 151; notes module 153; map module 154; word processing applications; JAVA-enabled applications; encryption; digital rights management; voice recognition; and/or voice replication.

As known in the art, the camera module 143 (in conjunction with, for example, touch screen 112, display controller 156, optical sensor(s) 164, optical sensor controller 158, contact module 130, graphics module 132, and image management module 144) may be configured to capture still images or video (including a video stream) and store them into memory 102, modify characteristics of a still image or video, or delete a still image or video from memory 102.

As known in the art, the image management module 144 (in conjunction with, for example, touch screen 112, display controller 156, contact module 130, graphics module 132, text input module 134, and camera module 143) may be configured to arrange, modify or otherwise manipulate, label, delete, present (e.g., in a digital slide show or album), and store still and/or video images.

As known in the art, the video player module 145 (in conjunction with, for example, touch screen 112, display controller 156, contact module 130, graphics module 132, audio circuitry 110, and speaker 111) may be configured to display, present or otherwise play back videos (e.g., on the touch screen 112 or on an external, connected display via external port 124).

As known in the art, the online video module 155 (in conjunction with, for example, touch screen 112, display system controller 156, contact module 130, graphics module 132, audio circuitry 110, speaker 111, RF circuitry 108,) may be configured to allow the user to access, browse, receive (e.g., by streaming and/or download), play back (e.g., on the touch screen 112 or on an external, connected display via external port 124), upload and/or otherwise manage online videos in one or more file formats, such as, for example, H.264.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module. The memory 102 may store a subset of the modules and data structures identified above. Furthermore, memory 102 may store additional modules and data structures not described above.

The device 5110 may be configured so as to allow operation of a predefined set of functions on the device be performed exclusively through a touch screen 112 and/or a touchpad. By using a touch screen and/or a touchpad as the primary input/control device for operation of the device 5110, the number of physical input/control devices (such as push buttons, dials, and the like) on the device 5110 may be reduced.

The predefined set of functions that may be performed exclusively through a touch screen and/or a touchpad may include navigation between user interfaces. In some embodiments, the touchpad, when touched by the user, navigates the device 5110 to a main, home, or root menu from any user interface that may be displayed on the device 5110.

Referring to FIG. 1a, in some embodiments, the device 5110 may include a depiction of business card 5115. In some embodiments, the display 112 allows a user to interact with the present application. Such interactions include the ability to sign 5112 the business card 5115, edit 5114 the business card 5115, and/or post 5116 business card 5115. Each of sign 5112, edit 5114, and post 5116 may be displayed on the device 5110 as interactive buttons or widgets to provide a user interface for the user to interact with the present application and select one of sign 5112, edit 5114, and post 5116.

In addition, second computing device 5140 is depicted as a single computing device with a single display. This again is done for ease of description and understanding of the present invention. It is expected that the present description may include multiple second computing devices 5140, such as for receiving a plurality of business cards 5150, including business cards from different users, which users may or may not be in the same location, for example.

For the ease of description, the remainder of the present description will refer to a business card 5115, 5150, which includes any type of information transferred from one device to another including, but not limited to, the depicted business card. Other types of information that may be transferred may include file types such as Documents (i.e., iWork and Office), PDFs, Audio files, Music, Video files, Movies, Images, Text Files, CSV Files, "Notes", and Links added to core features and photos, data files, applications, by way of non-limiting example only.

Referring to FIG. 1a, the delivering of a business card 5115 from first device 5110 to second device 5140 as business card 5150 may occur over a variety of mediums using a multitude of different transmission paths 5125. Paths 5125 may include wireless and wired connections, direct connections via application to application, emailed transmissions, SMS, MMS, and other data transfer protocols.

Figure 2:
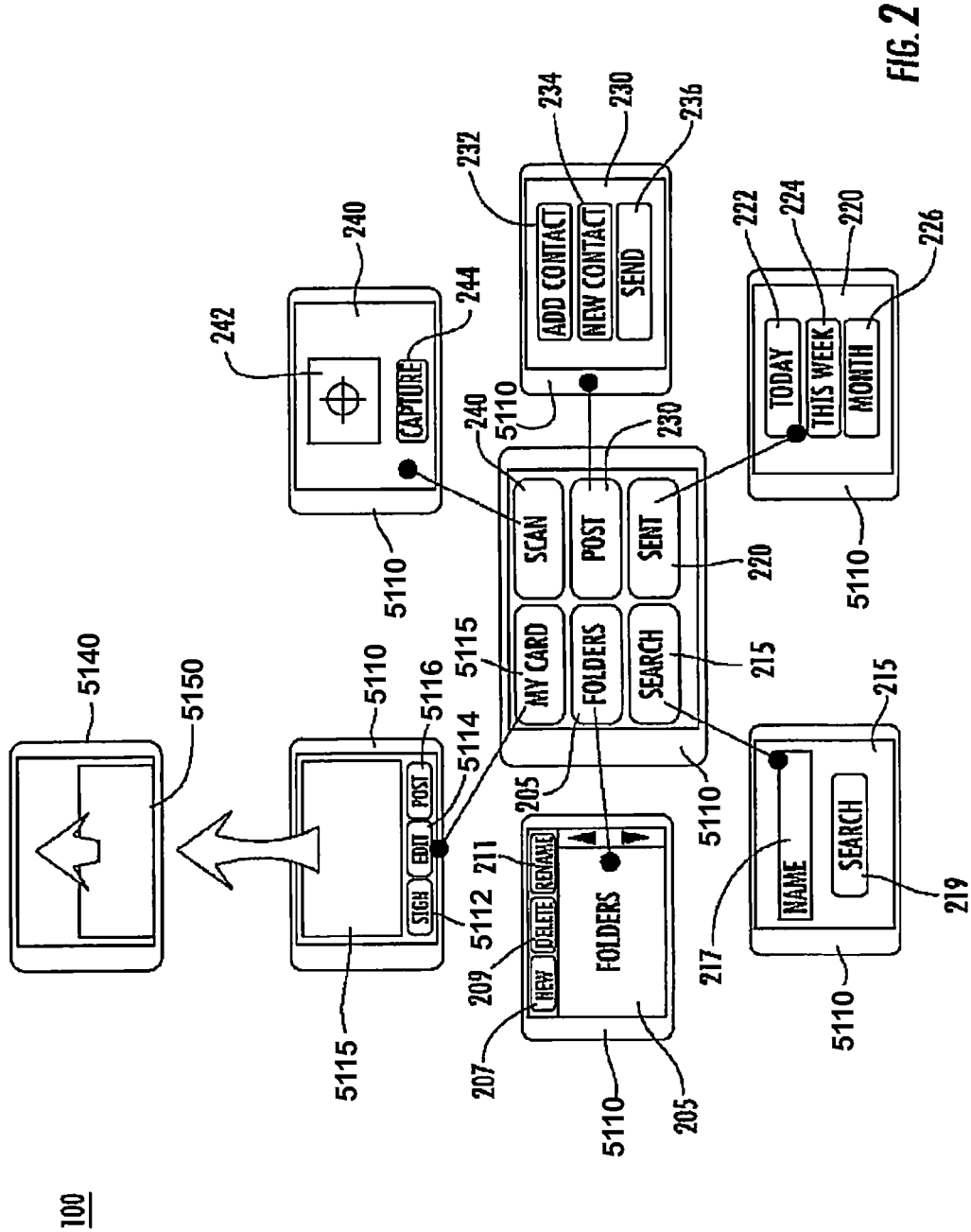
FIG. 2 illustrates a diagram of the system of the present invention.

FIG. 2 illustrates an exploded view of system 100 featuring additional features of the present application. As shown in FIG. 2, system 100 may enable a user to interact with a first computing device 5110 in a multitude of different ways. Each of these ways of interacting may be initiated by a user depressing a selection on first computing device 5110, or otherwise interacting with first computing device 5110. For example, as shown in FIG. 2, computing device 5110 may provide a series of buttons that enable progression through a hierarchical menu. As shown in FIG. 2, these buttons may include my card 5115, folders 205, search 215, sent 220, post 230, and scan 240. Selection of a given one of these actions navigates the application to the respective sub-action level. Each of these buttons may then launch a user window displayed on first computing device 5110.

Interaction with a button such as my card 5115 may launch a display on first computing device 5110 depicting a user's business card 5115 as well as any additional features available for interacting with the business card, including, but not limited to, sign 5112, edit 5114, and post 5160. For example, a user may designate business card 5115 for delivery. By activating the "My card" 5115 menu, a user may be able to swipe a finger along the display of first computing device 5110 or otherwise activate delivery to deliver business card 5115 to second computing device 5140. Before sending business card 5115, a user may add a personal message onto the card such as by activating the sign 5112, or edit 5114 functions of system 100.

Interaction with a button such as folders 205 may launch a display on first computing device 5110 depicting a folders system for storing business cards and information. This display may include the ability for a user to create a new 207 folder, a delete 209 folder, and/or rename 211 a folder. Users may maintain copies of received business cards 5150 in folders 205. For example, a user may have a family folder, a technology folder, an investment folder, and the like. A user may create 207 different folders to store received business cards 5150 on second computing device 5140 with a user's space in the cloud on the application network. In order to navigate through folders 205, a user may activate the "folders" menu 205 of second computing device 140.

Initiating a button such as search 215 may launch a display on first computing device 5110 depicting a search screening. This may include a user selectable region 217 that allows a user to enter information on which to base a search. With respect to a business card this may include a person's name, title, phone number, company, e-mail address, website address, or other information included in a business card. By activating "search" 215, system 100 may provide a business search engine allowing users to search for services and business cards of a service. Users may choose to publish pertinent information on the network and allow for other users to locate and identify business cards 5115 using the "search" function 215.

Initiating a button such as sent 220 may launch a display on first computing device 5110 that enables a user to examine business cards that have been sent in this application. This display may include additional hierarchical buttons that allow a user to examine sent items today 222, this week 224, and this month 226, for example.

Within the send menu 220, system 100 may provide a networking tool. That is, data may be provided regarding circulation of business card 5115, by initiating the "sent" menu 220. Upon distribution of business card 5115, a user may know, for example, when business card 5115 was distributed to second computing device 5140 and the parties involved in the distribution, in addition to numerous other statistics. Users may also setup mass distribution, so that business card 5115 may be distributed to multiple second computing devices 5140 substantially simultaneously. In order to expand the community, users may distribute business card 5115 to second computing devices 5140 using email distribution. The email may include an image of business card 5115, such as in JPG form, for example, and may also include a link to the business card application.

Selecting a button such as post 230 may launch a display on first computing device 5110 that enables a user to add contacts 232, provide a new contact 234, and/or send information 236. The display may provide add contacts 232, new contacts 234, and send information 236 using additional hierarchical buttons selectable by a user. By selecting the "post" button 230, a user may be able to provide business card 5115 and any associated information as described to the network of host site, described below.

Selecting a button such as scan 240 may launch a display on first computing device 5110 that enables a user to scan a business card or other information, such as by using a camera built-in to first computing device 5110. A display may be provided at a target 242 included for outlining the business card to be scanned. Once the business card and first computing device 5110 are aligned, such that the image of the business card to be scanned is incorporated correctly within target 242, a capture button 244 may be depressed to initiate the scan of the business card.

By using scan button 240, a business card may also include an authoring engine that allows users to build a business card on first computing device 5110 by entering information. Within the business card 5115 the user can attach information such as official websites and other links, and business information. The "scan" feature 240 of the business card application may be able to capture relevant information from business cards, using Optical Character Recognition (OCR) technology and/or other technology. The user can also auto import the information.

Figure 3:
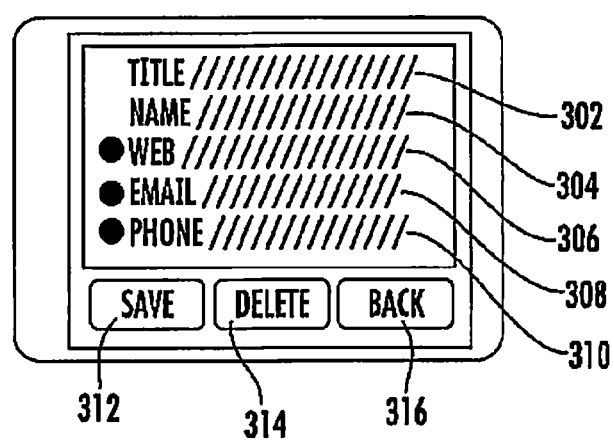
FIG. 3 illustrates a business card utilized within the system.

FIG. 3 illustrates a business card 5115 and/or business card 5150 utilized within the system 100. This business card may contain a title 302, name 304, web information 306, email address 308 and phone number 310. Additional information may also be included as would be evident to those possessing an ordinary skill in the pertinent arts. The web information 306 may include the ability to guide the first computing device's 5110 browser to a certain website. That is, this information may be provided in hyperlink, or the like. Further, the email address 308 may be included, such that activating the email address 308 may use the first computing device 5110 to send an email to that respective address. Similarly, the phone number 310 may be provided so that activating the phone number 310 causes the first computing device 5110 to attempt to connect to that phone number. Details for particular information may be housed on the front or back of the card, both in a real sense and in the virtual sense in the application. Obviously, a toggle may be created to turn these features off/on as desired. While the present description discusses activating a portion of the business card 5115 on first computing device 5110, these activations may similarly be achieved on second computing device 5140 through the interaction with business card 5150.

The application may include an offering engine that allows a user to build a business card 5115 on the first computing device 5110 using predefined templates. For example, there may be a plurality of templates, such as 5 to 10 templates, to select from that vary in specific fields and position of fields. These templates may provide the ability to add information and attach a photo and/or logo to the business card 5115. With the business card 5115, the user can attach information such as name of the individual, telephone number, email address, company name and information, and the like. An official website address and other links may be loaded onto the business card 5115 from first computing device 5110.

Users may export information from the business cards 5115, 5150 to applications that include contacts. Users may be able to create and delete or share business cards 5115, 5150. System 100 may include created business cards 5115, received business cards 5150 and allow business cards 5115, 5150 to be grouped in the folders and searched.

Figure 4:
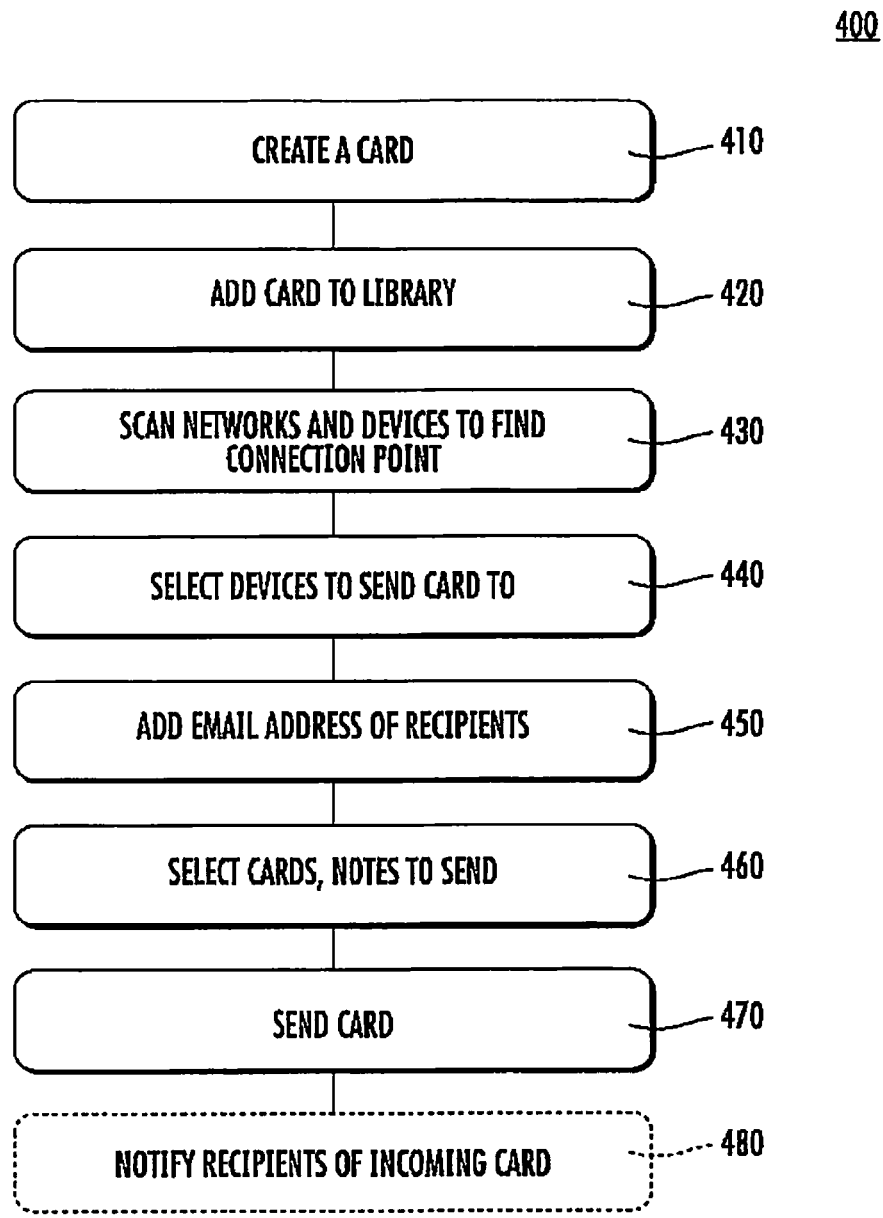
FIG. 4 illustrates the method of providing a business card on the first computing device to a second computing device.

FIG. 4 illustrates the method 400 of providing a business card on the first computing device to a second computing device within system 100. Method 400 includes creating the business card at 410. The business card 5115 may be created as discussed herein above. As discussed above, business card 5115 may be categorized in folders. Method 400 includes adding the business card to a library or hierarchical folder system at 420.

At 430, method 400 includes scanning networks and devices to find a connection point for the first computing device. At 440, method 400 selects a device as the second computing device which is to be sent a business card from the first computing device.

This selection may be based on the devices located in 430. Second computing devices 140 that are not located may be delivered the business card 5115 via email. Method 400 includes adding e-mail addresses of recipients that cannot be located to be sent the business card 5115 directly, and/or those where email delivery may provide a benefit, at 450.

At 460, method 400 includes selecting business card(s) and notes or signatures to include in the delivery. Users may preview the selection prior to sending, and the receiving users may be able to preview files and notes prior to saving the received information to the second computing device.

Received information may be provided in an initial storage location such as initially storing in a new "Files" tab, while allowing the sending user via first computing device with the option of connecting to Dropbox, Google Drive, or iCloud or other storage accounts to upload/download files for sharing. The "files" tab may provide an option of previewing files before including the files for sending. Before distributing a business card 5115, the user can add a personal message on the business card 5115 and users that received business cards 5150 may add notes. The message/notes may not appear on the face of the card although the message/notes may be stored as an attachment that may be viewed by interacting with first or second computing device 5110, 140. A link to information may also be included with the delivery.

At 470, method 400 includes sending the business card and any associated attachment, link or file, as discussed. Method 400 may optionally include notifying recipients of an incoming business card at 480. This notification may allow a user of second computing device 5140 the option of accepting or denying the incoming business card 5150.

Figure 5:
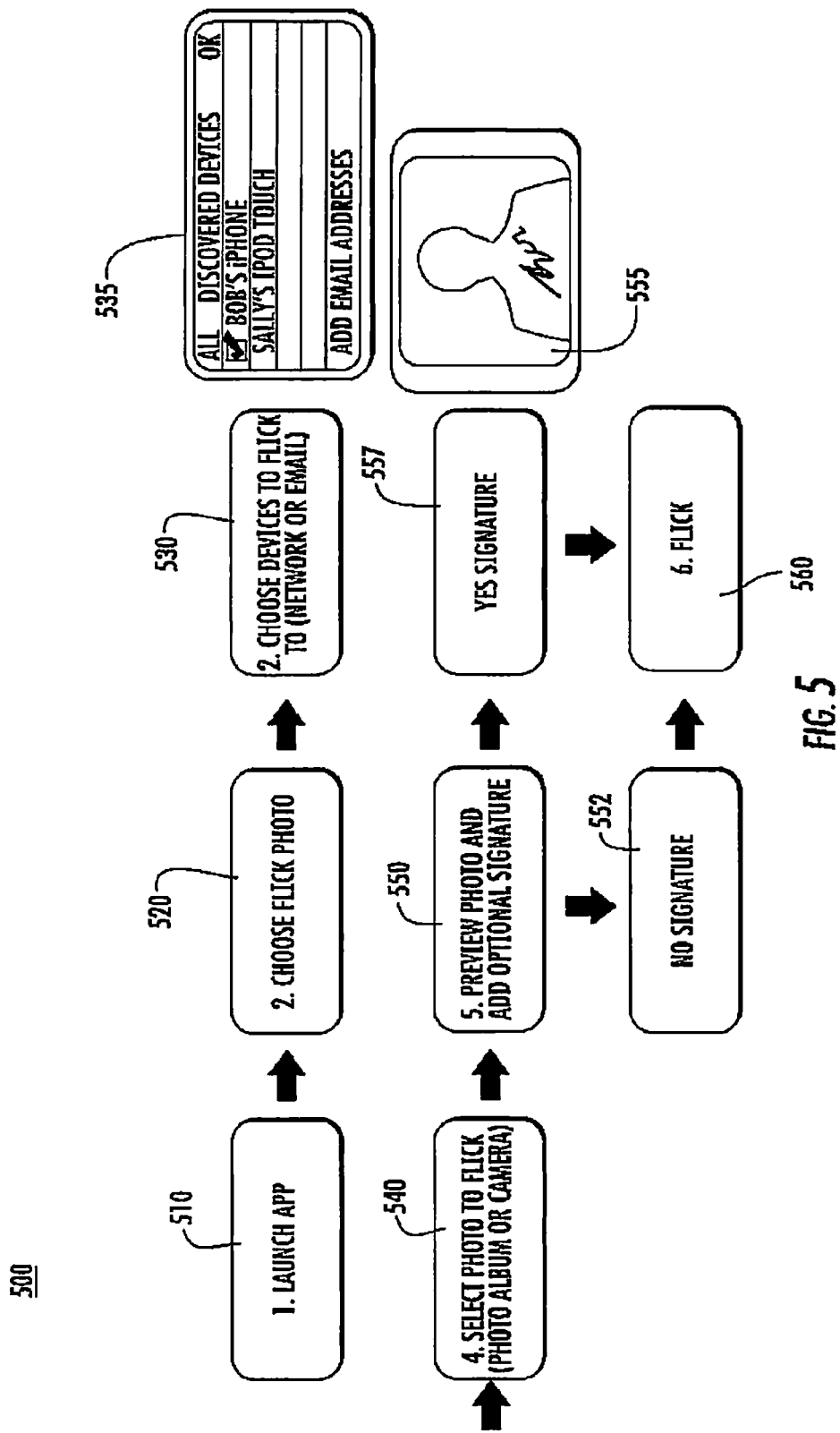
FIG. 5 illustrates a method for providing a photo on the first computing device to a second computing device.

A similar method may be used for sharing a photo. Sharing a photo may provide the option of including a hand-drawn signature. FIG. 5 illustrates a method 500 for providing a photo on the first computing device to a second computing device within system 100. Method 500 includes initiating an application to transfer the photo at 510. Method 500 includes choosing to transfer the photo at 520.

At 530, method 500 includes choosing devices to transfer the photo to such as by over the network or by e-mail. Method 500 may include a display, at 535, showing all devices that are discovered and that may be selected to receive the sent photo. A user may select devices to send the photo to.

At 540, method 500 includes selecting the photo to transfer from a photo album or the camera, for example. Method 500 includes previewing the photo and optionally providing a signature on the photo at step 550. At 550, the method 500 may branch to "no signature" at 552 or to "yes signature" at 557. In the case where a signature is being provided, a display at 555 may be shown allowing the user to sign the image before sending at 560.

Method 500 culminates by sending the photo to the designated devices at 560. The sending may occur via WiFi network, Bluetooth, NIC, or by email, for example, as discussed herein.

In some embodiments, a computing device 600 (shown in FIG. 6) that may be used to implement features described herein. In some embodiments, the computing device 600 may be the first computing device 5110 and/or the second computing device 5140. The computing device 600 includes a processor 602, a memory device 604, a communication interface 606, a data storage device 608, a touchscreen display 610, and a motion detector 612. These components may be connected via a system bus 614 in the computing device 600, and/or via other appropriate interfaces within the computing device 600.

Figure 6:
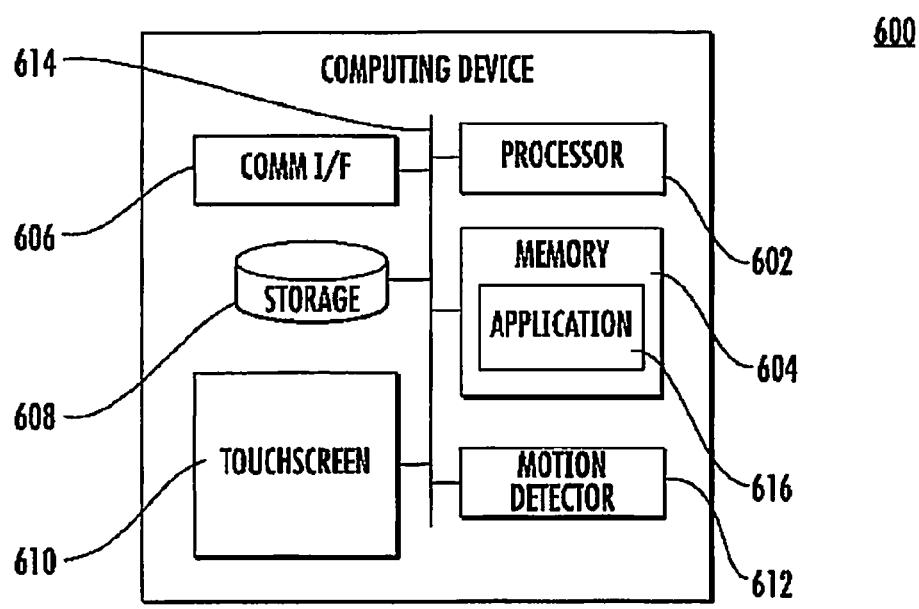
FIG. 6 is a block diagram of the general components of an example computing device, such as the first or second computing device, on which a disclosed application may be executed.

The memory device 604 may be or include a device such as a Dynamic Random Access Memory (D-RAM), Static RAM (S-RAM), or other RAM or a flash memory. As shown in FIG. 6, the application 616 may be loaded into the memory device 604.

The data storage device 608 may be or include a hard disk, a magneto-optical medium, an optical medium such as a CD-ROM, a digital versatile disk (DVDs), or Blu-Ray disc (BD), or other type of device for electronic data storage. The data storage device 608 may store instructions that define the application 616, and/or data that is used by the application 616.

The communication interface 606 may be, for example, a communications port, a wired transceiver, a wireless transceiver, and/or a network card. The communication interface 606 may be capable of communicating using technologies such as Ethernet, fiber optics, microwave, xDSL (Digital Subscriber Line), Wireless Local Area Network (WLAN) technology, wireless cellular technology, and/or any other appropriate technology.

The touchscreen display 610 may be based on one or more technologies such as resistive touchscreen technology, surface acoustic wave technology, surface capacitive technology, projected capacitive technology, and/or any other appropriate touchscreen technology.

The motion detector 612 may include one or more three-axes acceleration motion detectors (e.g., accelerometers) operative to detect linear acceleration in three directions (i.e., the X (left/right) direction, the Y (up/down) direction, and the Z (out of plane) direction). Alternatively, the motion detector 612 can include one or more two-axis acceleration motion detectors 612 which can be operative to detect linear acceleration only along each of the X or Y directions, or any other pair of directions. Alternatively or additionally, the motion detector 612 may be or include an electrostatic capacitance accelerometer that is based on a technology such as silicon micro-machined MEMS (Micro Electro Mechanical Systems) technology, a piezoelectric type accelerometer, a piezoresistance type accelerometer, or any other suitable type of accelerometer.

When the touchscreen 610 receives data that indicates user input, the touchscreen 610 may provide the data to the application 616. Alternatively or additionally, when the motion detector 612 detects motion, the motion detector 612 may provide the corresponding motion information to the application 616.

As shown in FIG. 6, the application 616 is loaded into the memory device 604. Although actions are described herein as being performed by the application 616, this is done for ease of description and it should be understood that these actions are actually performed by the processor 602 (in conjunction with the persistent storage device, network interface, memory, and/or peripheral device interface) in the computing device 600, according to instructions defined in the application 616. Alternatively or additionally, the memory device 604 and/or the data storage device 608 in the computing device 600 may store instructions which, when executed by the processor 602, cause the processor 602 to perform any feature or any combination of features described above as performed by the application 616. Alternatively or additionally, the memory device 604 and/or the data storage device 608 in the computing device 600 may store instructions which, when executed by the processor 602, cause the processor 602 to perform (in conjunction with the memory device, communication interface, data storage device, touchscreen display, and/or motion detector) any feature or any combination of features described above as performed by the application 616.

The computing device 600 shown in FIG. 6 may be, for example, an Apple iPad, or any other appropriate computing device. The application 616 may run on an operating system such as iOS, Android, Linux, Windows, and/or any other appropriate operating system.

Figure 7:
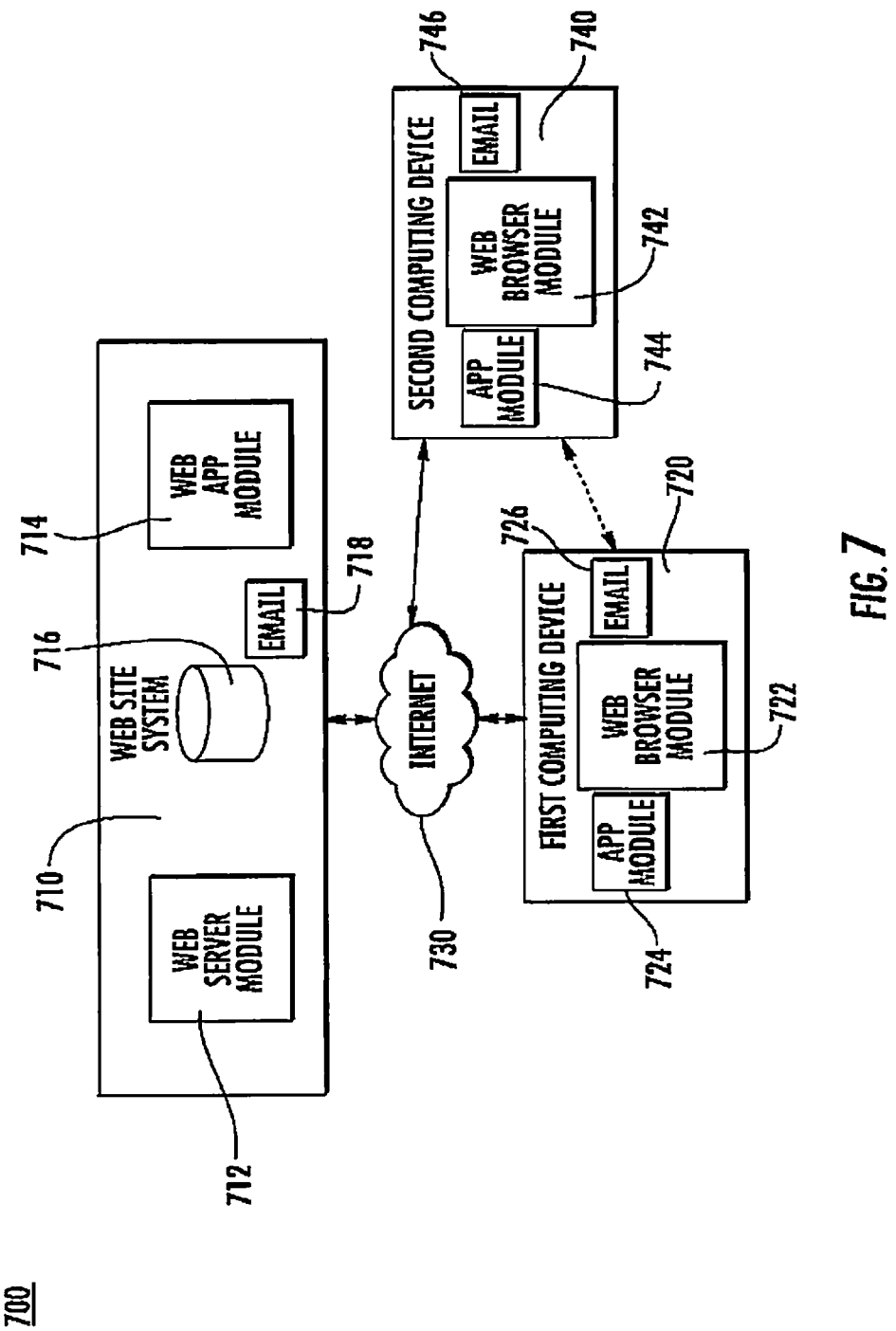
FIG. 7 illustrates an example system architecture wherein features described herein may be implemented.

FIG. 7 shows an example architecture 700 wherein features described herein may be implemented. The example architecture 700 includes a web site system 710, a first computing device 720, the Internet 730, and the second computing device 740. The web site system 710 of FIG. 7 includes hardware (such as one or more server computers) and software for implementing an application as described. The first computing device 720 described above may be used to download and run a local application to interact with other applications and/or software to allow the transfer of information. Alternatively, an end user may use the first computing device 720 to display and interact with the web pages that make up the interactive web site. The device 720 shown in FIG. 7 may be, for example, a laptop or desktop computer, a tablet computer, a smartphone, a PDA, and/or any other appropriate type of device.

The web site system 710 includes a web server module 712, a web application module 714, a database 716, and an email system 718, which, in combination, store and process data for providing the web site. The web application module 714 may provide the logic behind the web site provided by the web site system 710, and/or perform functionality related to the generation of the web pages provided by the web site system 710. The web application 714 may communicate with the web server module 712 for generating and serving the web pages that make up the web site.

Email system 718 may provide an alternative delivery path for the business cards and other information sent as described. This email system may include any methodology of exchanging digital messages from an author to one or more recipients and may exchange information between sender and receiver(s) using Simple Mail Transfer Protocol (SMTP), for example. This may include instant messaging and store and forward models of email systems. Email system 718 may include a server, such as a MAPI, IMAP, POP3, and/or web-based email server, that operates as a connection between sender and receiver(s). Email system 718 may connect to emails systems 726, 746.

The first computing device 720 may include a web browser module 722, which may receive, display, and interact with the web pages provided by the web site system 710. The web browser module 722 in the first computing device 720 may be, for example, a web browser program such as Internet Explorer, Firefox, Opera, Safari, and/or any other appropriate web browser program. To provide the web site to the user of the first computing device 720, the web browser module 722 in the first computing device 720 and the web server module 712 may exchange HyperText Transfer Protocol (HTTP) messages, per current approaches that would be familiar to a skilled person.

The application module 724 may provide the logic behind the second computing device and interaction provided by the web browser module 722, and/or performs functionality related to the generation of the web pages provided by the web browser module 722. The application module 724 may communicate with the web browser module 722 for generating and serving the web pages that make up the web site.

Email system 726 may provide an alternative delivery path for the business cards and other information sent as described. This email system may include any methodology of exchanging digital messages from an author to one or more recipients. This may include instant messaging and store and forward models of email systems. Email system 726 may include a server that operates as a connection between sender and receiver(s). Email system 726 may connect to emails systems 718, 746.

The second computing device 740 may include a web browser module 742, which may receive, display, and interact with the web pages provided by the web site system 710. The web browser module 742 in the second computing device 740 may be, for example, a web browser program such as Internet Explorer, Firefox, Opera, Safari, and/or any other appropriate web browser program. To provide the web site to the user of the second computing device 740, the web browser module 742 in the second computing device 740 and the web server module 712 may exchange HyperText Transfer Protocol (HTTP) messages, per current approaches that would be familiar to skilled person.

The application module 744 may provide the logic behind the second computing device and interaction provided by the web browser module 742, and/or performs functionality related to the generation of the web pages provided by the web browser module 742. The application module 744 may communicate with the web browser module 742 for generating and serving the web pages that make up the web site.

Email system 746 may provide an alternative delivery path for the business cards and other information sent as described. This email system may include any methodology of exchanging digital messages from an author to one or more recipients. This may include instant messaging and store and forward models of email systems. Email system 746 may include a server that operates as a connection between sender and receiver(s). Email system 746 may connect to emails systems 718, 726.

As described hereinabove, details regarding the interactive web site and the pages of the web site (as generated by the web site system 710 and displayed/interacted with by the user of the first computing device 720) are provided.

Registration to the site is required in order to interact using the first computing device 720. Users can create an account with the web site, and/or may log in via credentials associated with other web sites. With each user account, the user has a personal page. Via this page, users can establish "friends" links to other users, transmit/receive messages, and publish their bookmarks. Users can also publish in forums on the site, post comments, and create bookmarks.

The web site may include any number of different web pages, including but not limited to the following: a front (or "landing") page; a search results page; an account landing page; and a screening window page.

Via the account landing page, the user is able to perform actions such as: set options for the user's account; update the user's profile; customize the landing page and/or the account landing page; post information; perform instant messaging/chat with other users who are logged in; view information related to bookmarks the user has added; view information regarding the user's friends/connections; view information related to the user's activities; and/or interact with others and/or software for transferring information.

Advertising may be integrated into the site in any number of different ways. As one example, each or any of the pages in the web site may include banner advertisements. Alternatively, video advertisements may be played, and/or be inserted periodically.

The components in the web site system 710 (web server module 712, web application module 714, email system 718) may be implemented across one or more computing devices (such as, for example, server computers), in any combination.

The database 716 in the web site system 710 may be or include one or more relational databases, one or more hierarchical databases, one or more object-oriented databases, one or more flat files, one or more structured files, and/or one or more other files for storing data in an organized/accessible fashion. The database 716 may be spread across any number of computer-readable storage media. The database 716 may be managed by one or more database management systems in the web site system 710, which may be based on technologies such as Microsoft SQL Server, MySQL, PostgreSQL, Oracle Relational Database Management System (RDBMS), a NoSQL database technology, and/or any other appropriate technologies and/or combinations of appropriate technologies. The database 716 in the web site system 710 may store information related to the web site provided by the web site system 710, including but not limited to any or all information described herein as necessary to provide the features offered by the web site.

The web server module 712 implements the Hypertext Transfer Protocol (HTTP). The web server module 712 may be, for example, an Apache web server, Internet Information Services (IIS) web server, nginx web server, and/or any other appropriate web server program. The web server module 712 may communicate HyperText Markup Language (HTML) pages, handle HTTP requests, handle Simple Object Access Protocol (SOAP) requests (including SOAP requests over HTTP), and/or perform other related functionality.

The web application module 714 may be implemented using technologies such as PHP: Hypertext Preprocessor (PHP), Active Server Pages (ASP), Java Server Pages (JSP), Zend, Python, Zope, Ruby on Rails, Asynchronous JavaScript and XML (Ajax), and/or any other appropriate technology for implementing server-side web application functionality. In various implementations, the web application module 714 may be executed in an application server (not depicted in FIG. 7) in the web site system 710 that interfaces with the web server module 712, and/or may be executed as one or more modules within the web server module 712 or as extensions to the web server module 712. The web pages generated by the web application module 714 (in conjunction with the web server module 712) may be defined using technologies such as HTML (including HTML5), eXtensible HyperText Markup Language (XHMTL), Cascading Style Sheets, Javascript, and/or any other appropriate technology.

Alternatively or additionally, the web site system 710 may include one or more other modules (not depicted) for handling other aspects of the web site provided by the web site system 710.

The web browser module 722 in the first computing device 720 and/or the web browser module 742 in the second computing device 740 may include and/or communicate with one or more sub-modules that perform functionality such as rendering HTML, rendering raster and/or vector graphics, executing JavaScript, decoding and rendering video data, and/or other functionality. Alternatively or additionally, the web browser module 722, 742 may implement Rich Internet Application (RIA) and/or multimedia technologies such as Adobe Flash, Microsoft Silverlight, and/or other technologies, for displaying video. The web browser module 722, 742 may implement RIA and/or multimedia technologies using one or web browser plug-in modules (such as, for example, an Adobe Flash or Microsoft Silverlight plugin), and/or using one or more sub-modules within the web browser module 722, 742 itself. The web browser module 722, 742 may display data on one or more display devices (not depicted) that are included in or connected to the first computing device 720 and/or second computing device 740, such as a liquid crystal display (LCD) display or monitor. The first computing device 720 may receive input from the user of the first computing device 720 from input devices (not depicted) that are included in or connected to the first computing device 720, such as a keyboard, a mouse, or a touch screen, and provide data that indicates the input to the web browser module 722. The second computing device 740 may receive input from the user of the second computing device 740 from input devices (not depicted) that are included in or connected to the second computing device 720, such as a keyboard, a mouse, or a touch screen, and provide data that indicates the input to the web browser module 742.

As depicted in FIG. 7, the first computing device 720 and the second computing device 740 may be interconnected such as by infrared signal, NIC, Bluetooth or other direct communication methods.

Although the example architecture of FIG. 7 shows two computing devices, this is done for convenience in description, and it should be understood that the architecture of FIG. 7 in may include, mutatis mutandis, any number of computing devices with the same or similar characteristics as the described computing devices.

Although the methods and features are described herein with reference to the example architecture of FIG. 7, the methods and features described herein may be performed, mutatis mutandis, using any appropriate architecture and/or computing environment. Alternatively or additionally, although examples are provided herein in terms of web pages generated by the web site system 710, it should be understood that the features described herein may also be implemented using specific-purpose client/server applications. For example, each or any of the features described herein with respect to the web pages in the interactive web site may be provided in one or more specific-purpose applications. For example, the features described herein may be implemented in mobile applications for Apple iOS, Android, or Windows Mobile platforms, and/or in client application for Windows, Linux, or other platforms, and/or any other appropriate computing platform.

For convenience in description, the modules (web server module 712, web application module 714, web browser module 722 and email system 718) shown in FIG. 7 are described herein as performing various actions. However, it should be understood that the actions described herein as performed by these modules are in actuality performed by hardware/circuitry (i.e., processors, network interfaces, memory devices, data storage devices, input devices, and/or display devices) in the electronic devices where the modules are stored/executed.

Figure 8:
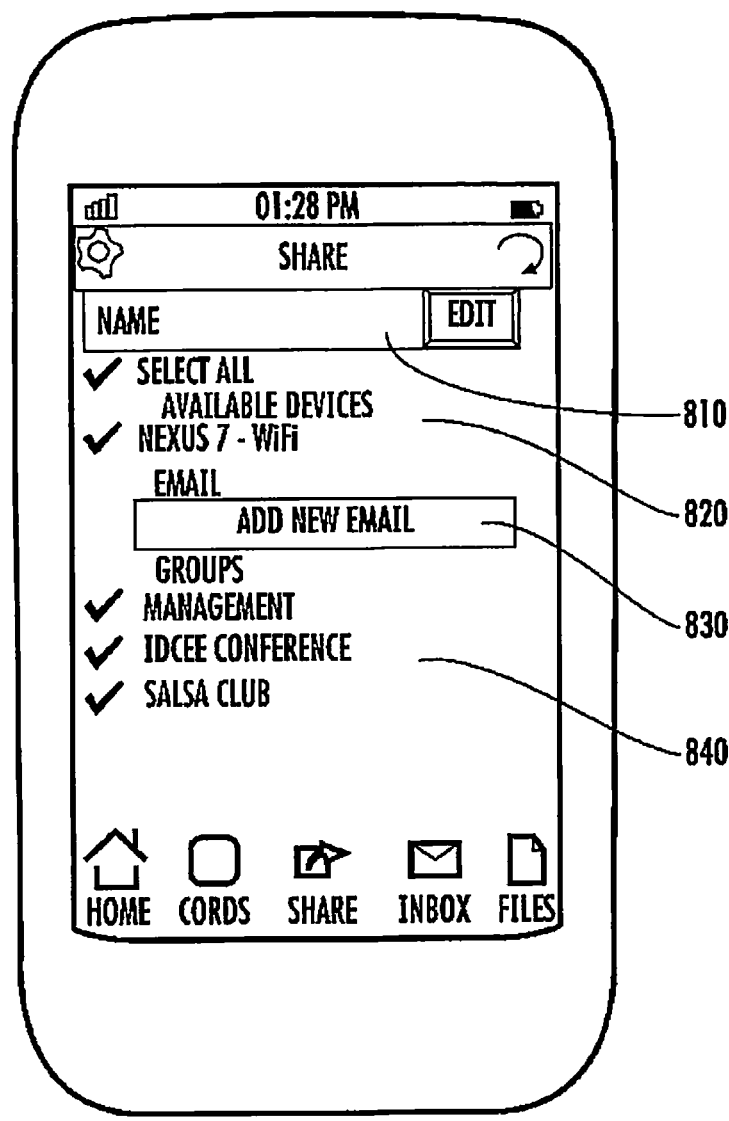
FIG. 8 illustrates a screen depiction of the disclosed application depicting the "share" screen.

FIG. 8 illustrates a screen depiction 800 of the present application showing a picture of the "share" screen. In this screen 800, a user may search for a particular individual by inputting a name 810 or other information, may select all available devices 820 or ones of the available devices, may connect through WiFi to particular devices and/or add e-mail addresses of contacts 830. Additionally, groups 840 may be created. In FIG. 8, groups 840 are depicted as management, International conference Investor Day in Central and Eastern Europe (IDCEE), and salsa club. Each of these groups 840 may contain individual contact information via WiFi, by e-mail or other connection to allow to sending information to the entities associated with the group as a whole.

Figure 9:
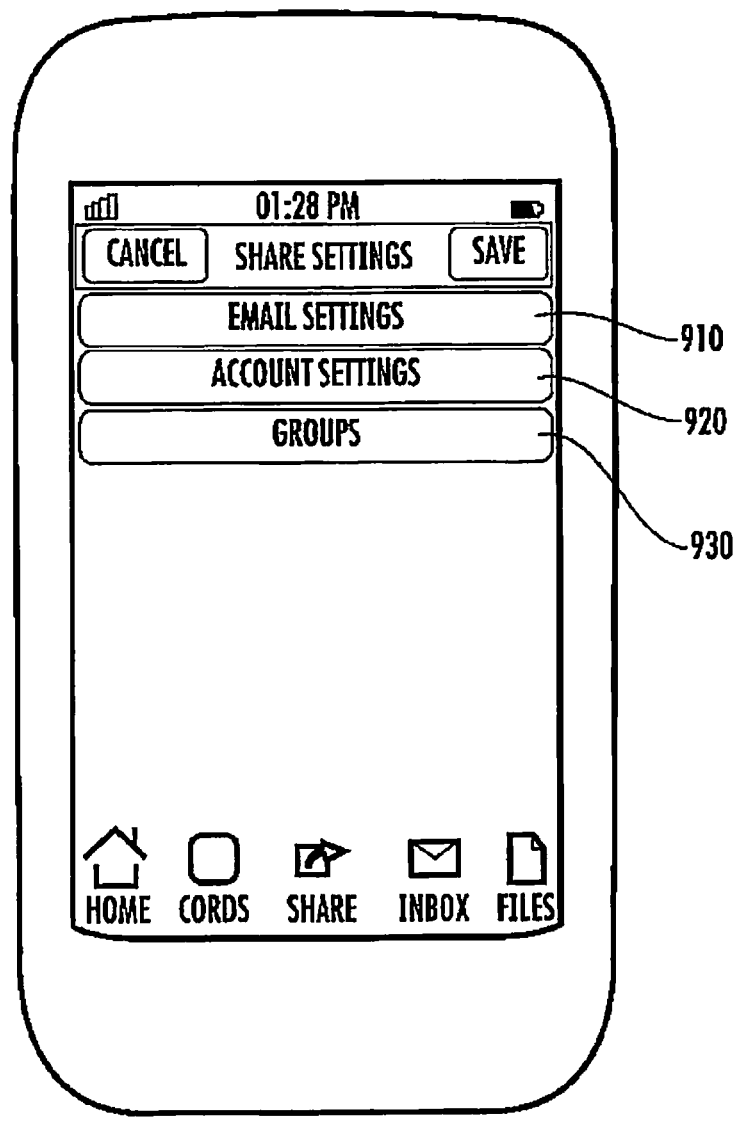
FIG. 9 illustrates a screen depiction of the disclosed application showing share settings that may be configured.

FIG. 9 illustrates a screen depiction 900 of the present application showing share settings that may be configured including e-mail settings 910, account settings 920, and group settings 930.

Figure 10:
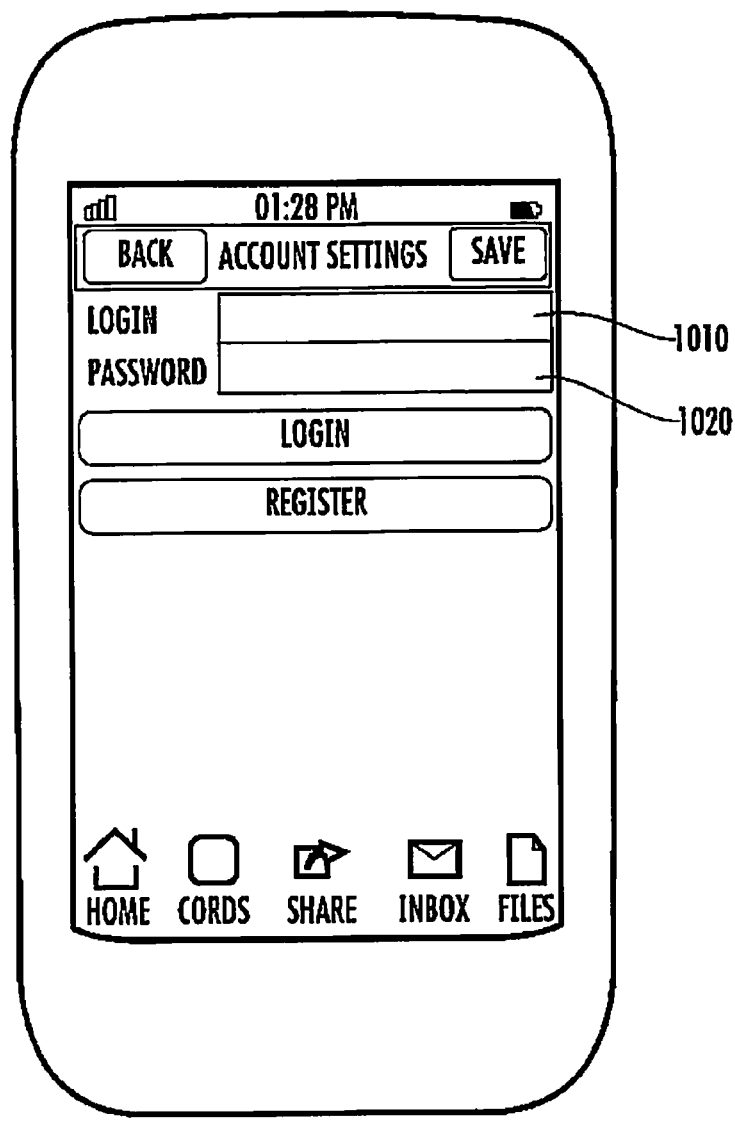
FIG. 10 illustrates a screen depiction of a prompt to login.

FIG. 10 illustrates a screen depiction 1000 of the account settings of FIG. 9 wherein a user may be prompted the login with a login 101 and password 1020 and register the respective device.

Figure 11:
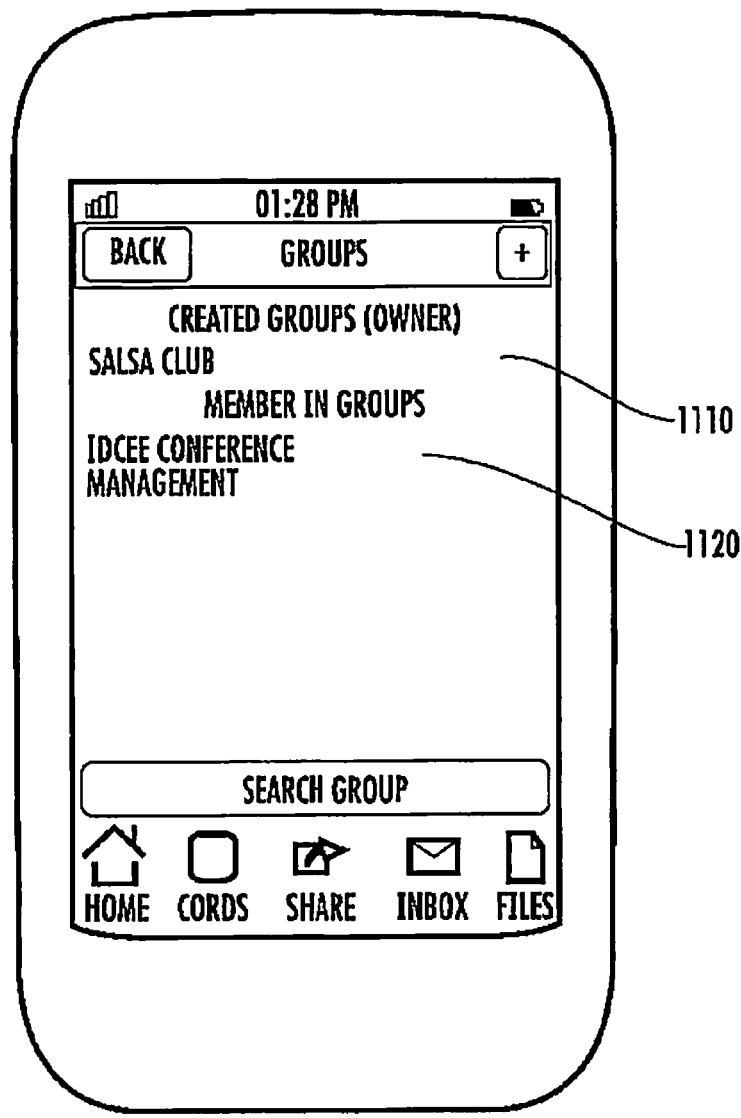
FIG. 11 illustrates a screen depicting a group creation screen and assigning members to groups.

FIG. 11 illustrates a screen depiction 1100 of the group settings of FIG. 9 wherein a user may create groups 1110 and assign members to groups 1120. Groups may also be searched for specific individuals. Also individuals may be created and configured in multiple groups.

Figure 12:
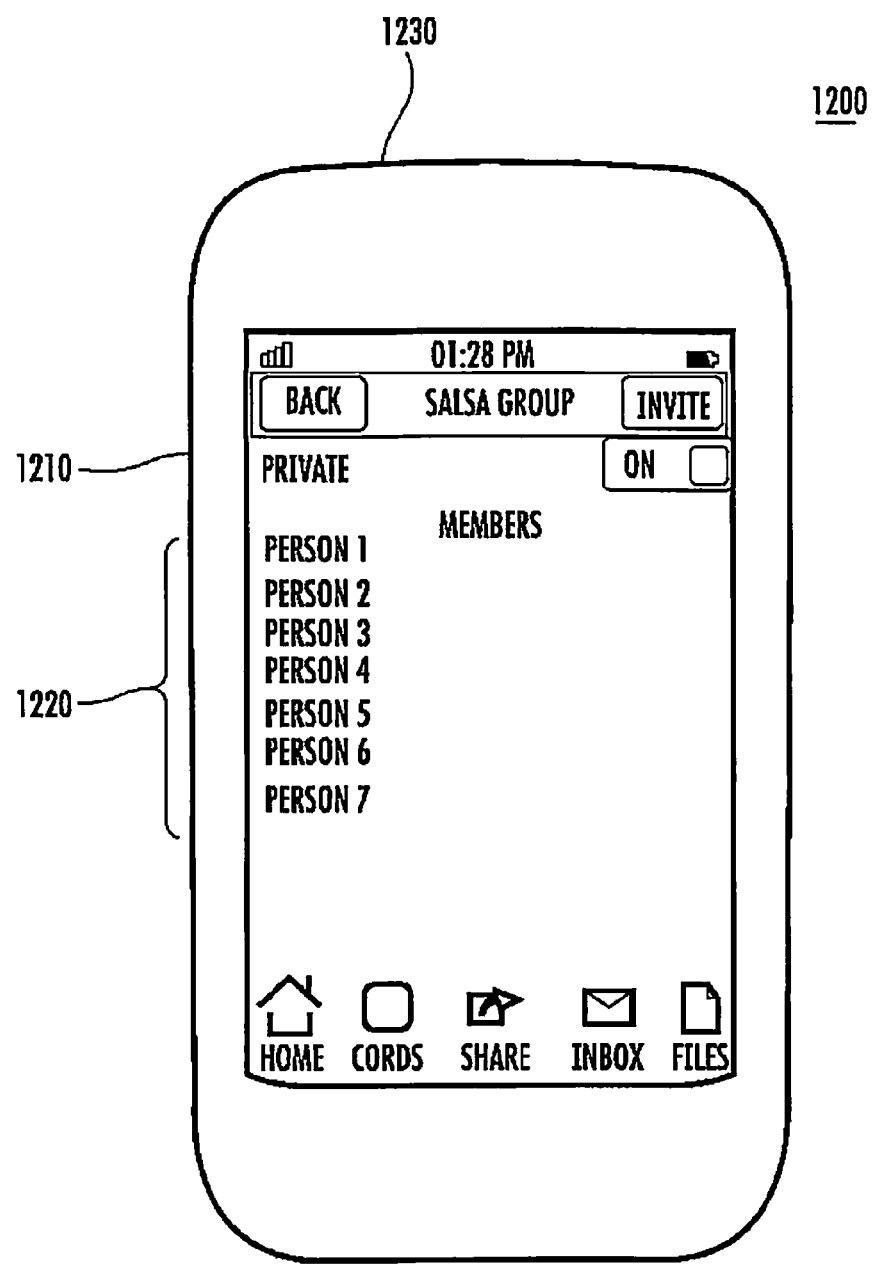
FIG. 12 illustrates a screen depiction of a group setting for an exemplary salsa group.

FIG. 12 illustrates a screen depiction 1200 of a group setting any exemplary salsa group 1230. The salsa group 1230 may include a number of members 1220 identified as person 1-7, each having particular contact information. The group may have a setting such as private or public 1210.

Figure 13:
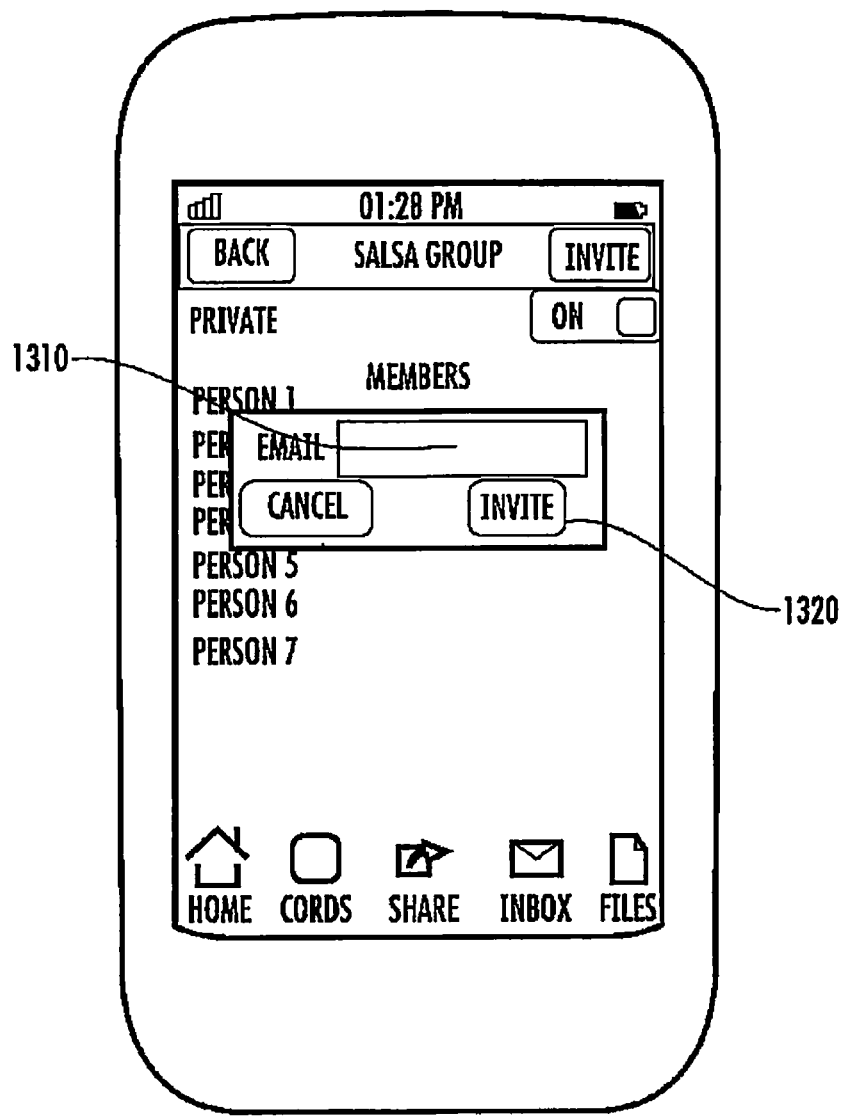
FIG. 13 illustrates a screen depicting the addition of a member to the exemplary salsa group.

FIG. 13 illustrates a screen depiction 1300 of the addition of a member to the exemplary salsa group by entering contact information such as e-mail 1310 for the member. Once entered, an invitation 1320 may be sent to the new member in this user may be added to the group. The group may be updated seamlessly throughout the contacts of all group members or updated solely on the respective device of a user who as invited group member.

Figure 14:
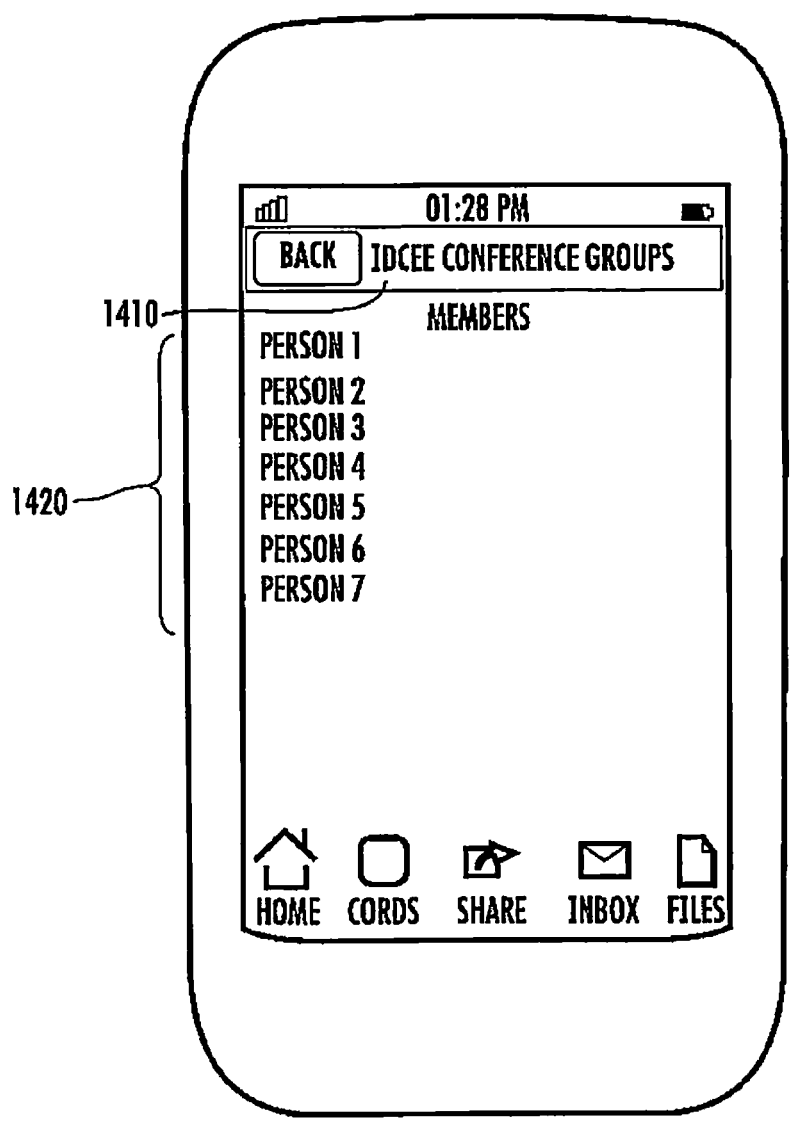
FIG. 14 illustrates a screen depiction of group settings of an exemplary International conference Investor Day in Central and Eastern Europe (IDCEE) group.

FIG. 14 illustrates a screen depiction 1400 of a group setting of an exemplary IDCEE group 1410. The IDCEE group 1410 may include a number of members 1420 identified as person 1-7, each having particular contact information.

Figure 15:
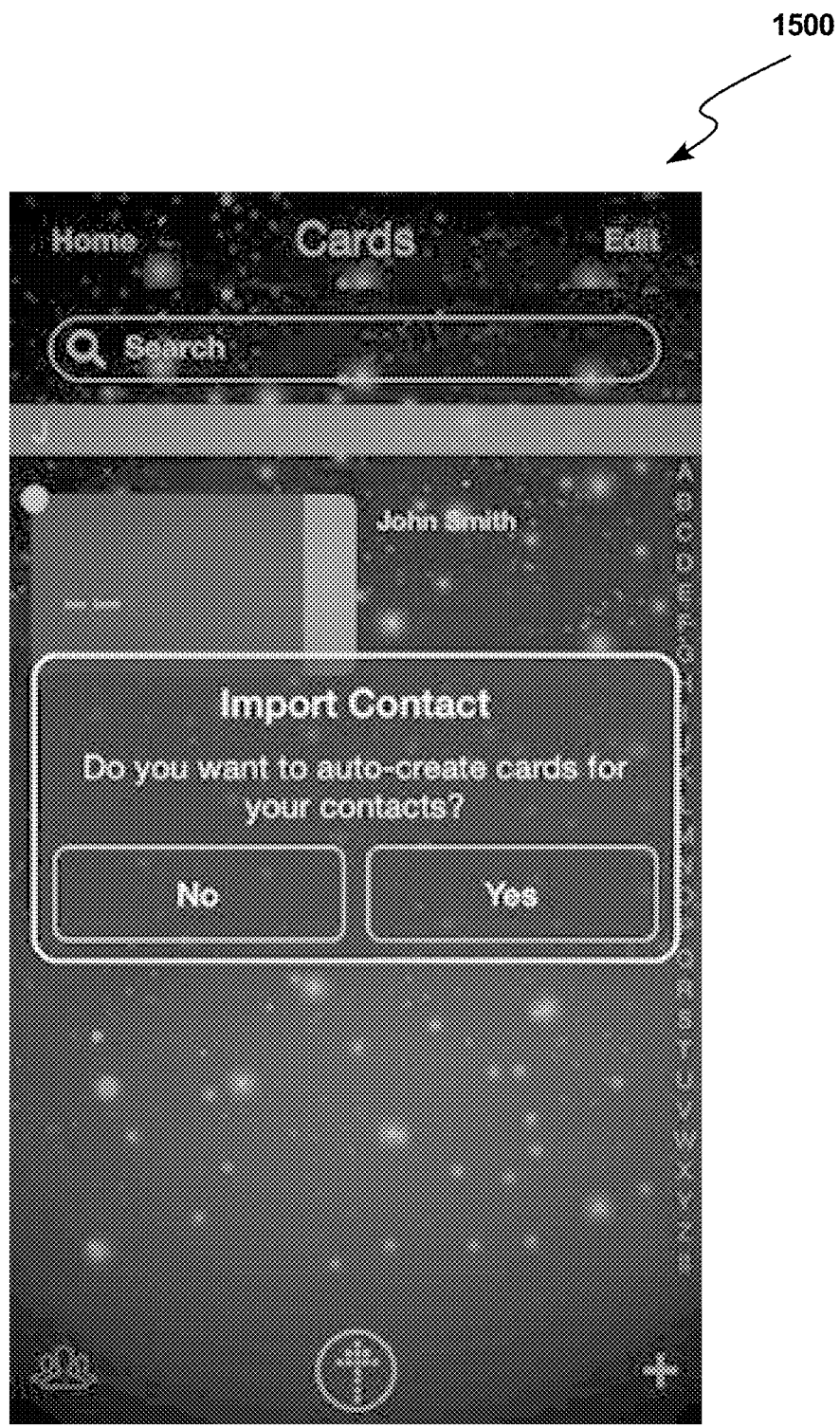
FIG. 15 illustrates an embodiment according to the present disclosure.

According to some embodiments, FIG. 15 illustrates a screen depiction 1500 allowing the user of the device 5110 to create card(s) for one or more contacts stored on the device 5110 or stored on a remote storage device or stored on a remote server.

Figure 16:
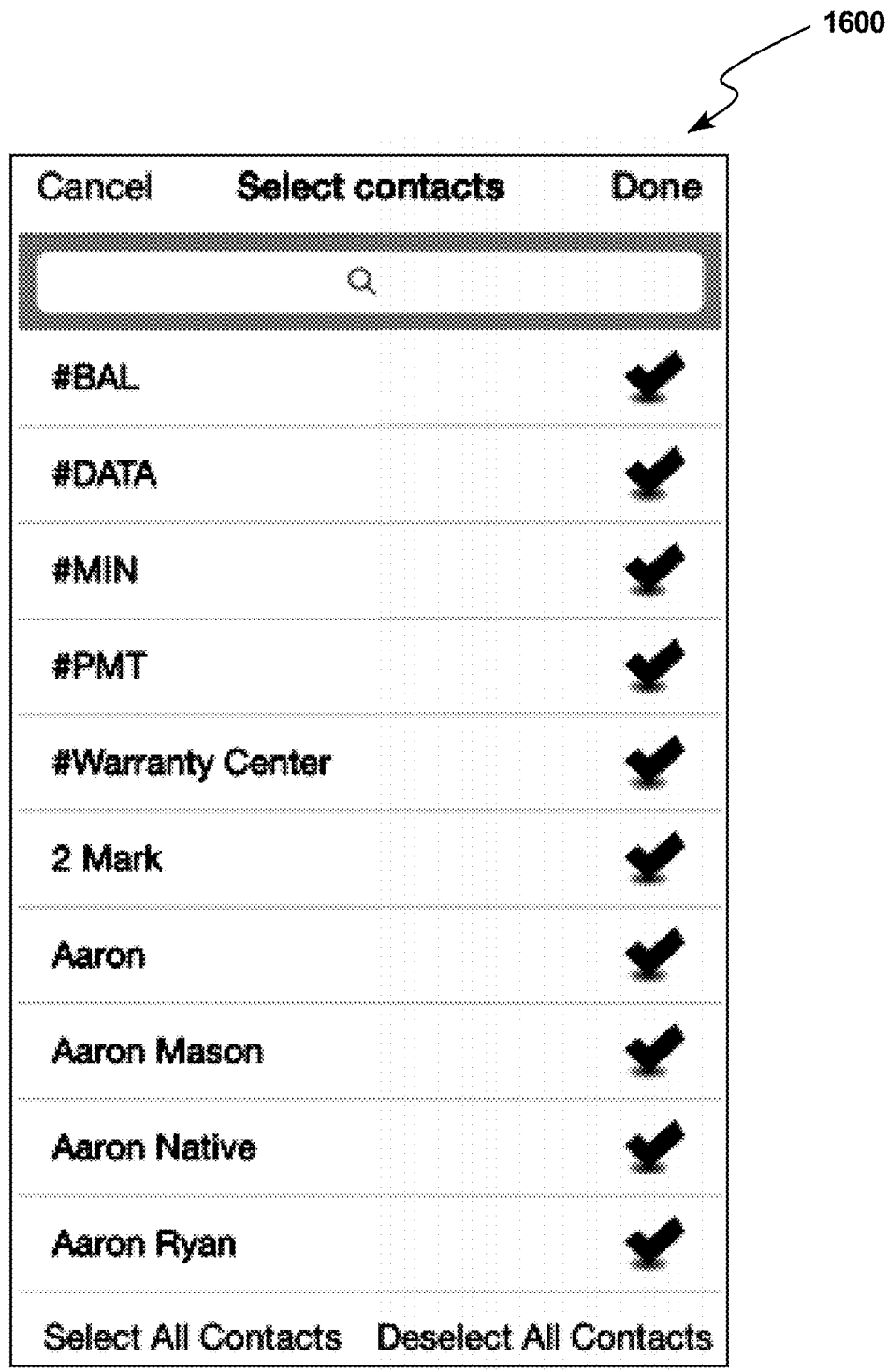
FIG. 16 illustrates an embodiment according to the present disclosure.

According to some embodiments, FIG. 16 illustrates a screen depiction 1600 allowing the user to select one or more contacts for each of which one or more cards will be created.

Figure 17:
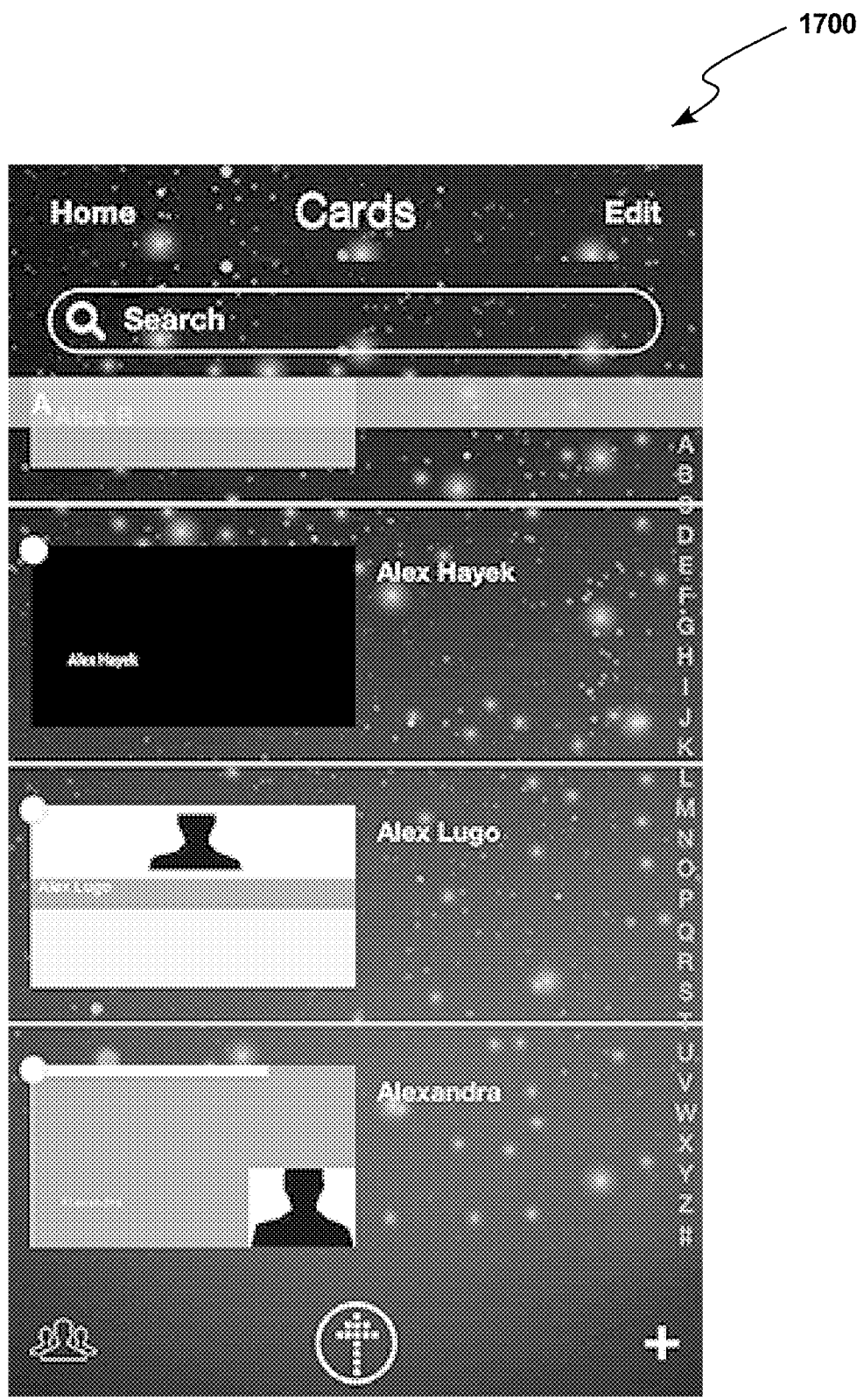
FIG. 17 illustrates an embodiment according to the present disclosure.

According to some embodiments, FIG. 17 illustrates a screen depiction 1700 allowing the user to select and preview and/or edit at least one card.

Figure 18:
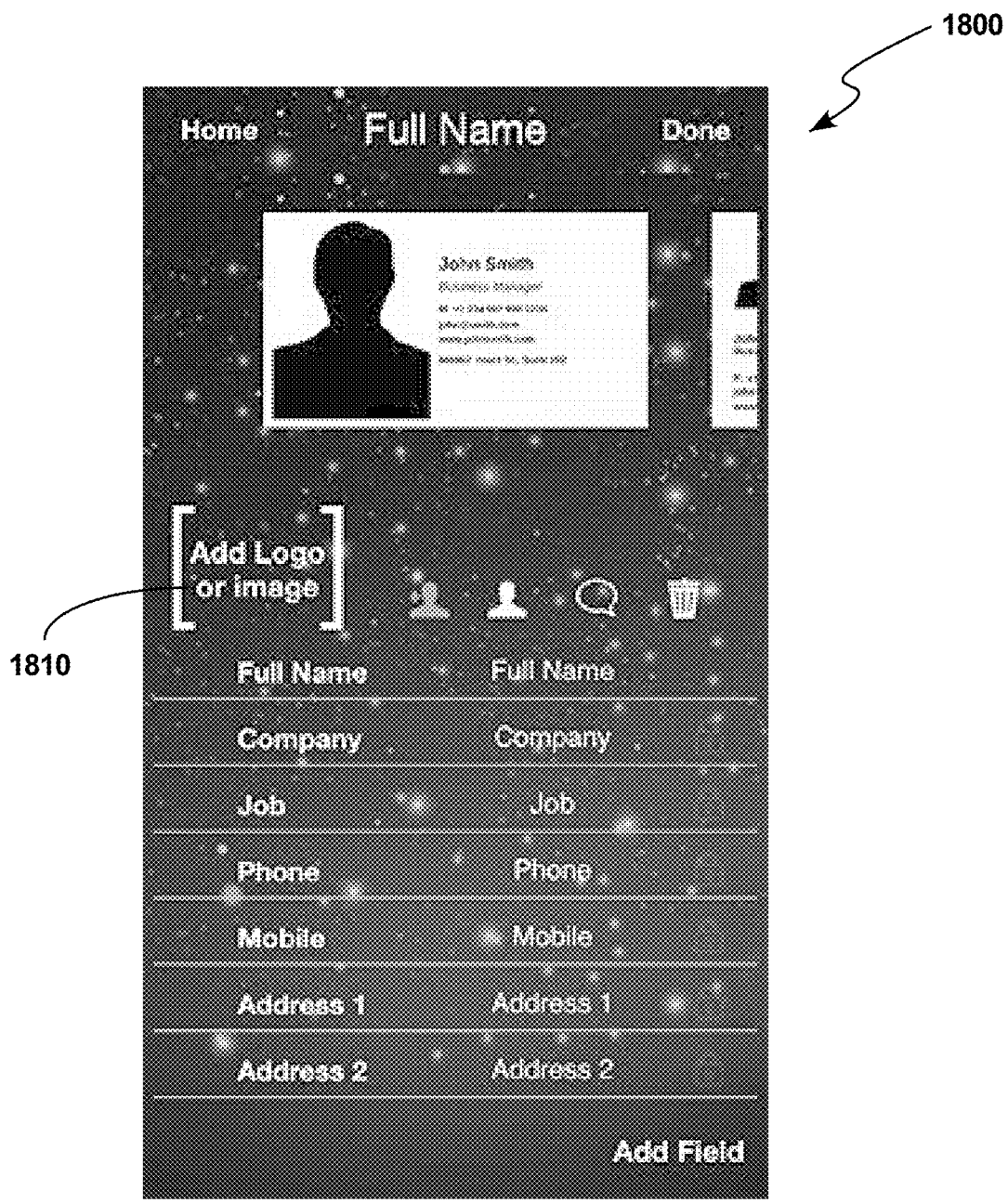
FIG. 18 illustrates an embodiment according to the present disclosure.

According to some embodiments, FIG. 18 illustrates a screen depiction 1800 allowing the user to add a logo, image or a video to a card shown, for example, in FIG. 17. As shown in FIG. 18, the logo, image and/or video option may be positioned, for example, in location 1810. According to some embodiments, selecting the logo, image and/or video option at the location 1810 provides user with screen 1900.

Figure 19:
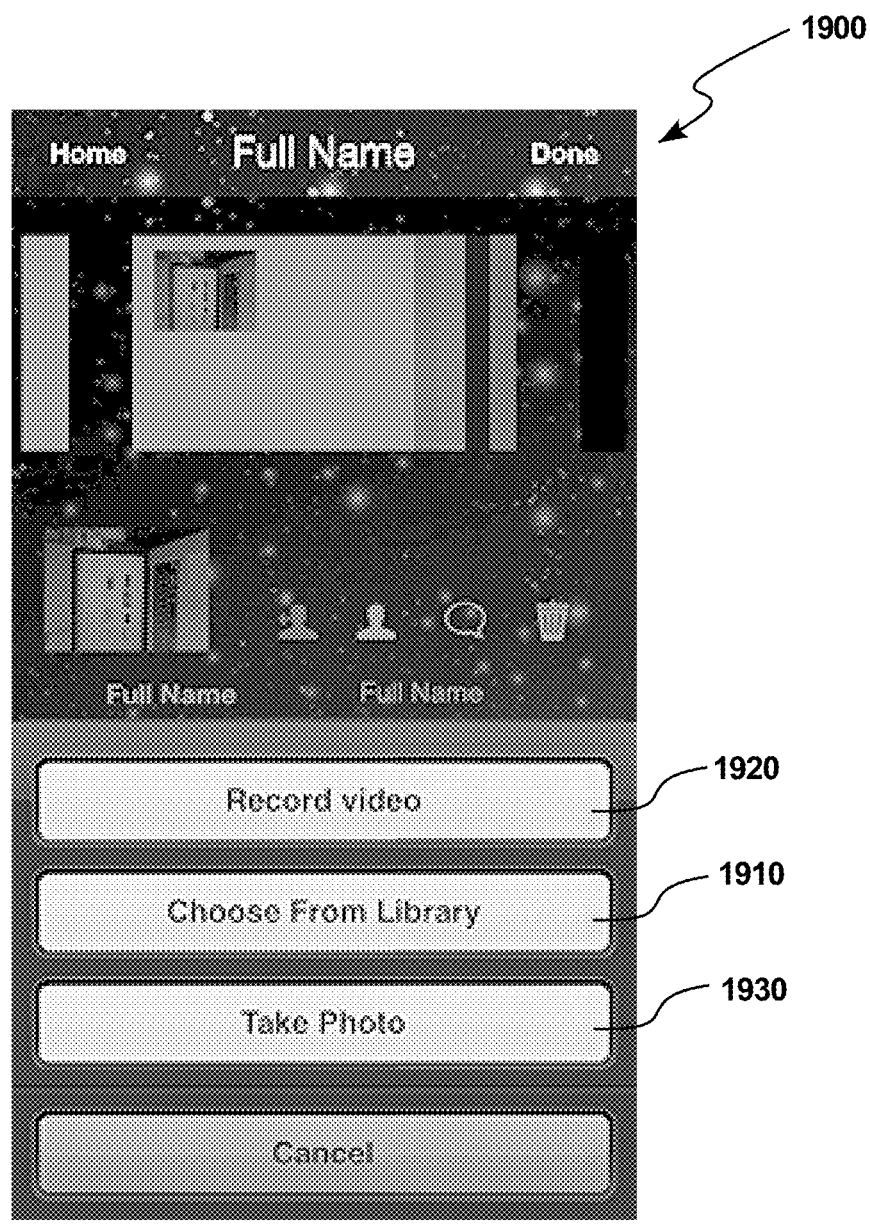
FIG. 19 illustrates an embodiment according to the present disclosure.

According to some embodiments, FIG. 19 illustrates a screen depiction 1900 allowing the user to select a video/image/logo from a library by selecting button 1910. According to some embodiments, FIG. 19 illustrates a screen depiction 1900 allowing the user to record a new video by selecting button 1920. According to some embodiments, FIG. 19 illustrates a screen depiction 1900 allowing the user to take a new image by selecting button 1930.

Figure 20:
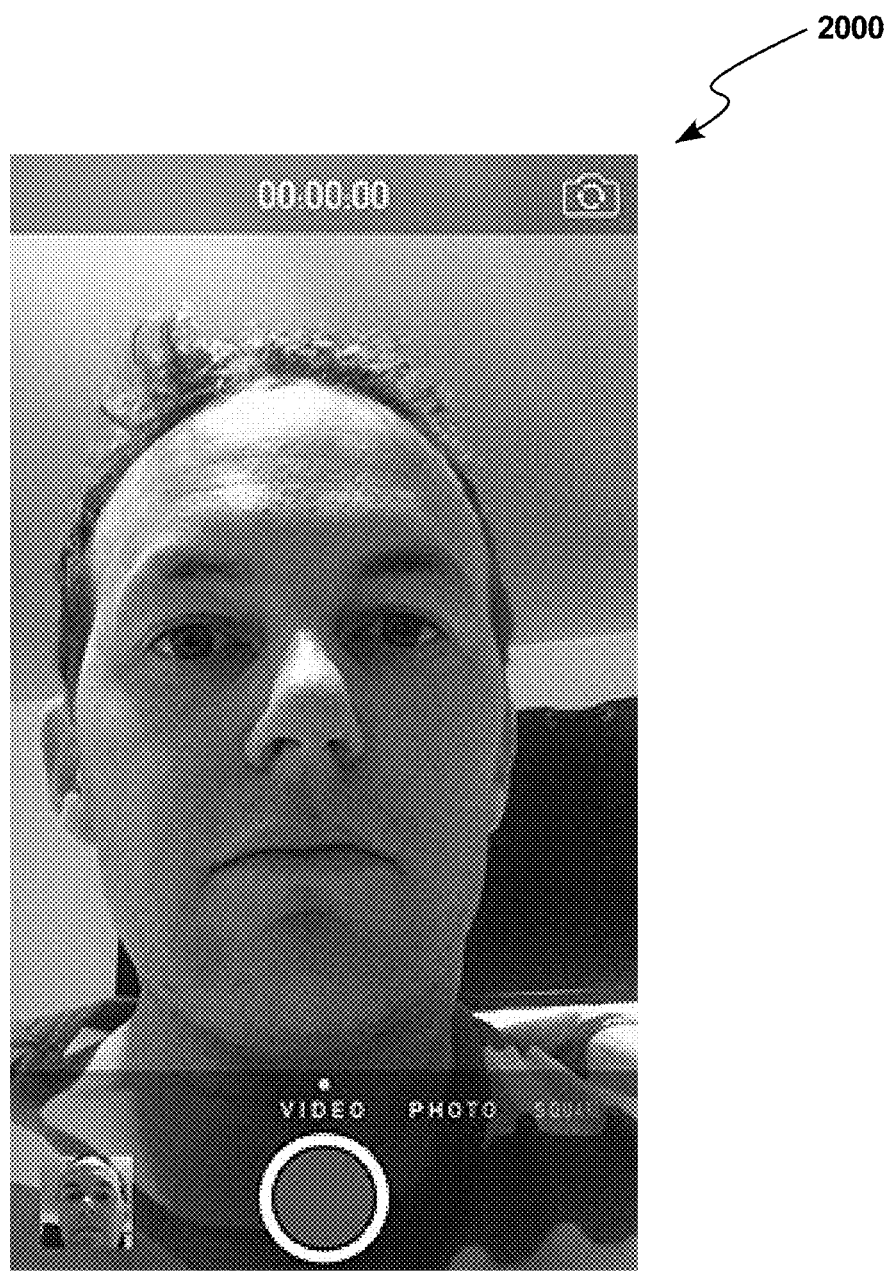
FIG. 20 illustrates an embodiment according to the present disclosure.

According to some embodiments, selecting the button 1920 provides user with screen 2000. FIG. 20 illustrates a screen depiction 2000 allowing the user to record a video after button 1920 is selected as shown in FIG. 19. According to some embodiments, the user is allowed to record a video of predetermined length and/or time.

Figure 21:
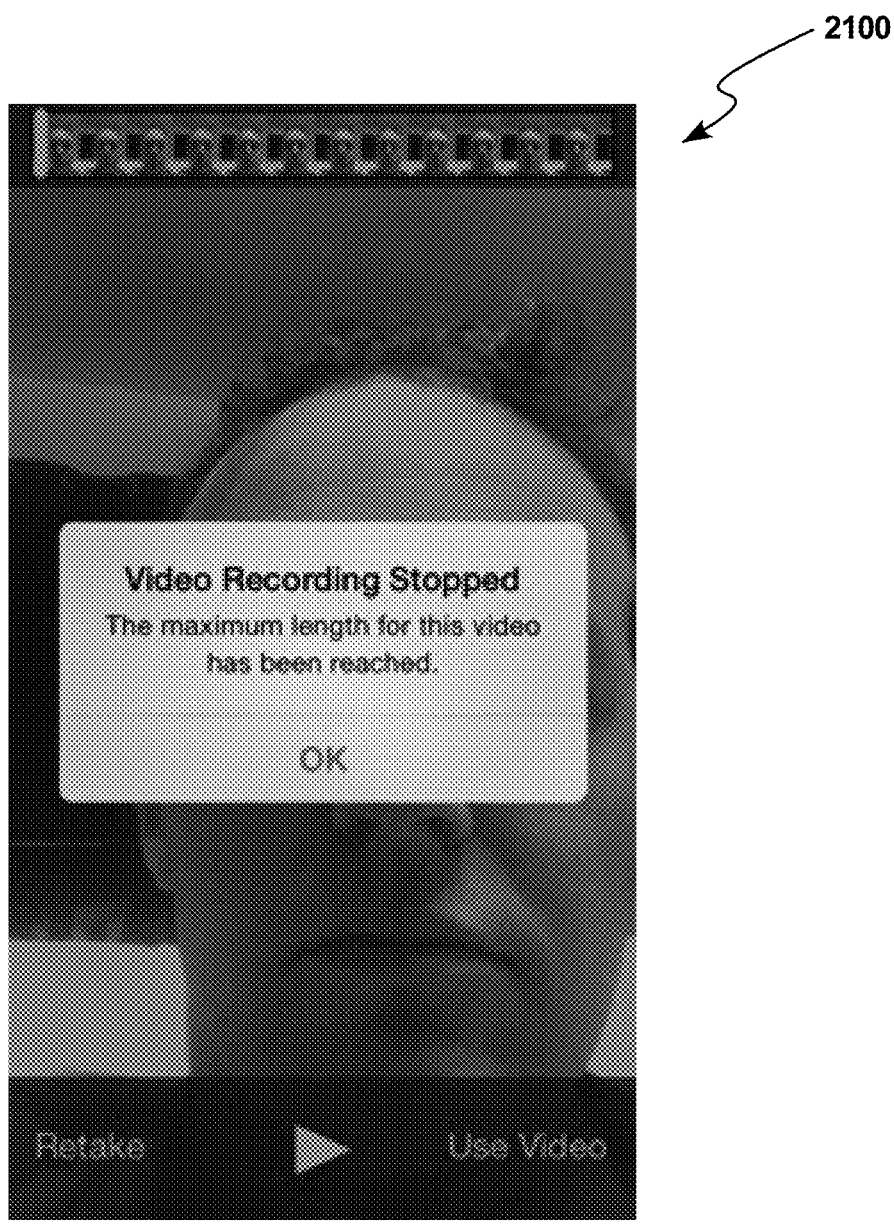
FIG. 21 illustrates an embodiment according to the present disclosure.
Figure 22:
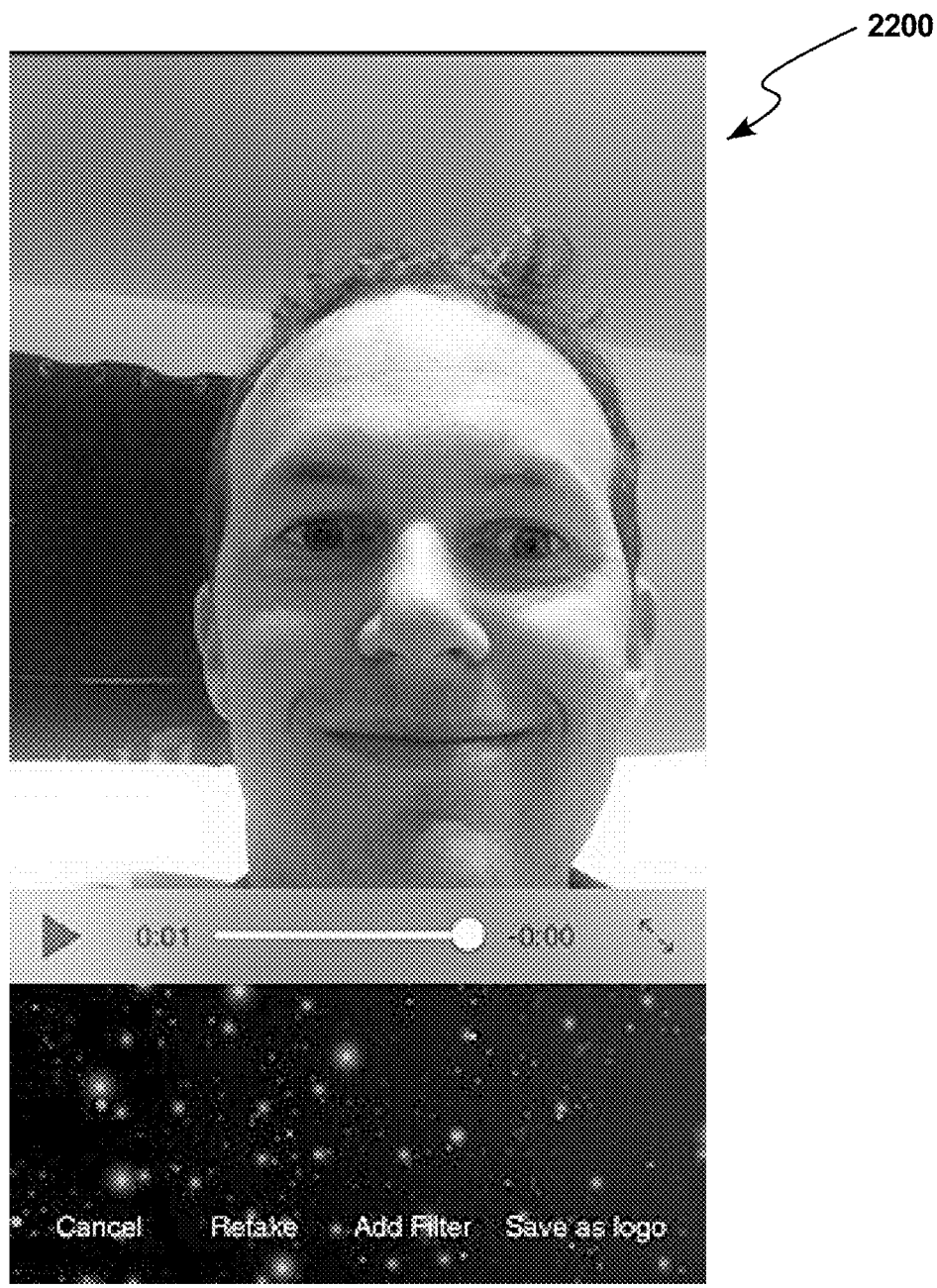
FIG. 22 illustrates an embodiment according to the present disclosure.

According to some embodiments, FIGS. 21 and 22 illustrate screen depictions 2100 and 2200 allowing the user to retake the video, preview the video and/or use the recorded video on one or more business cards.

According to some embodiments, selecting the button 1930 provides user with screen (not shown) allowing the user to take a photograph after button 1930 is selected as shown in FIG. 19. According to some embodiments, the user is allowed to include the newly take photograph in a blank card 2510 described in more detail below. According to some embodiments, the user is allowed to include the newly take photograph in a previously crated card (not shown).

According to some embodiments, selecting the button 1910 provides user with screen (not shown) allowing the user to select one or more photographs, or a video or a logo from a storage device after button 1910 is selected as shown in FIG. 19. According to some embodiments, the user is allowed to include the selected photograph and/or a video and/or a logo in a blank card 2510 described in more detail below. According to some embodiments, the user is allowed to include the selected photograph and/or video and/or logo in a previously crated card (not shown).

Figure 23:
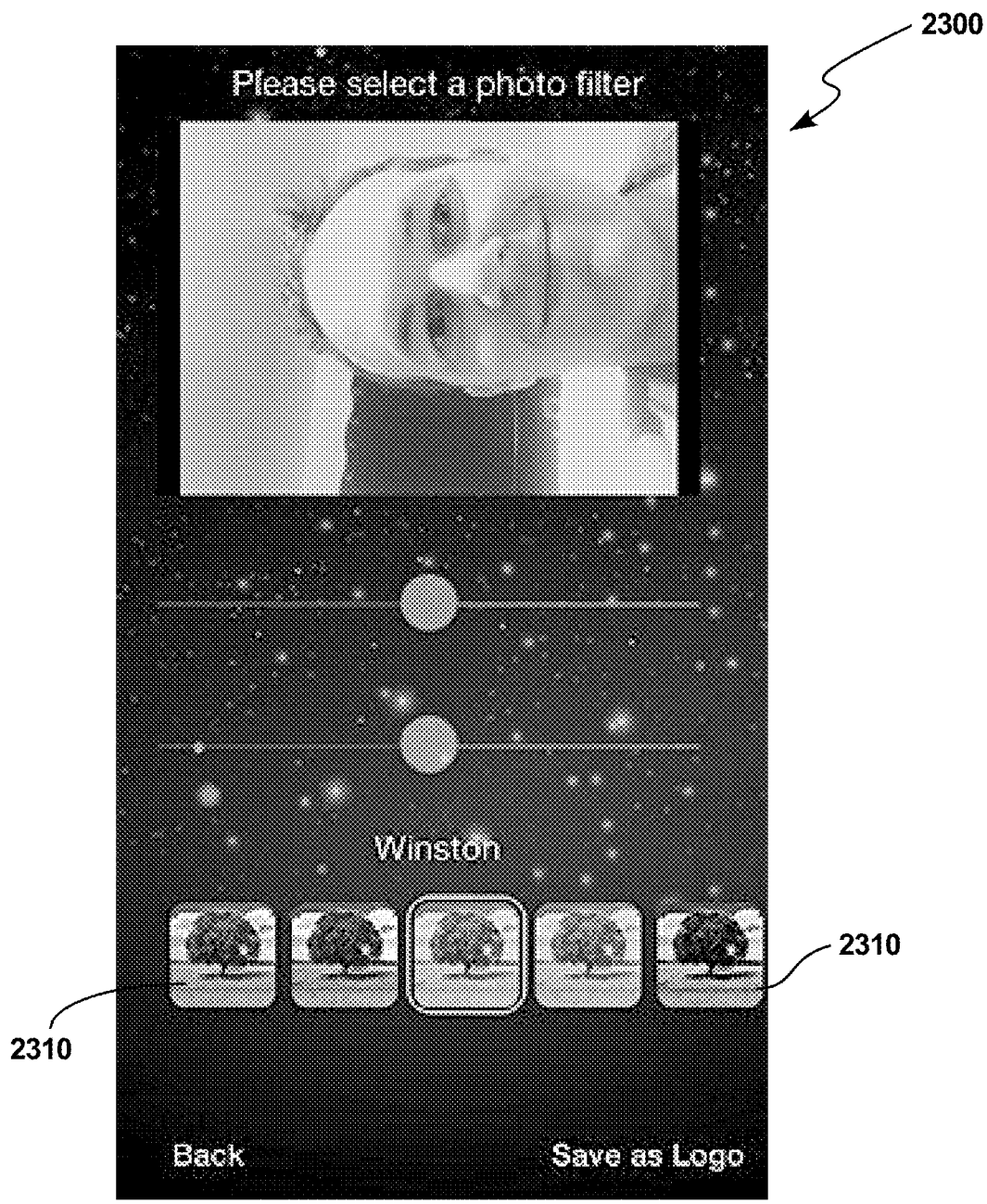
FIG. 23 illustrates an embodiment according to the present disclosure.

According to some embodiments, FIG. 23 illustrates a screen depiction 2300 allowing the user to select and add one or more filters 2310 to the recorded video. According to some embodiments, the one or more filters 2310 can be applied to a photograph to be included in a business card.

Figure 24:
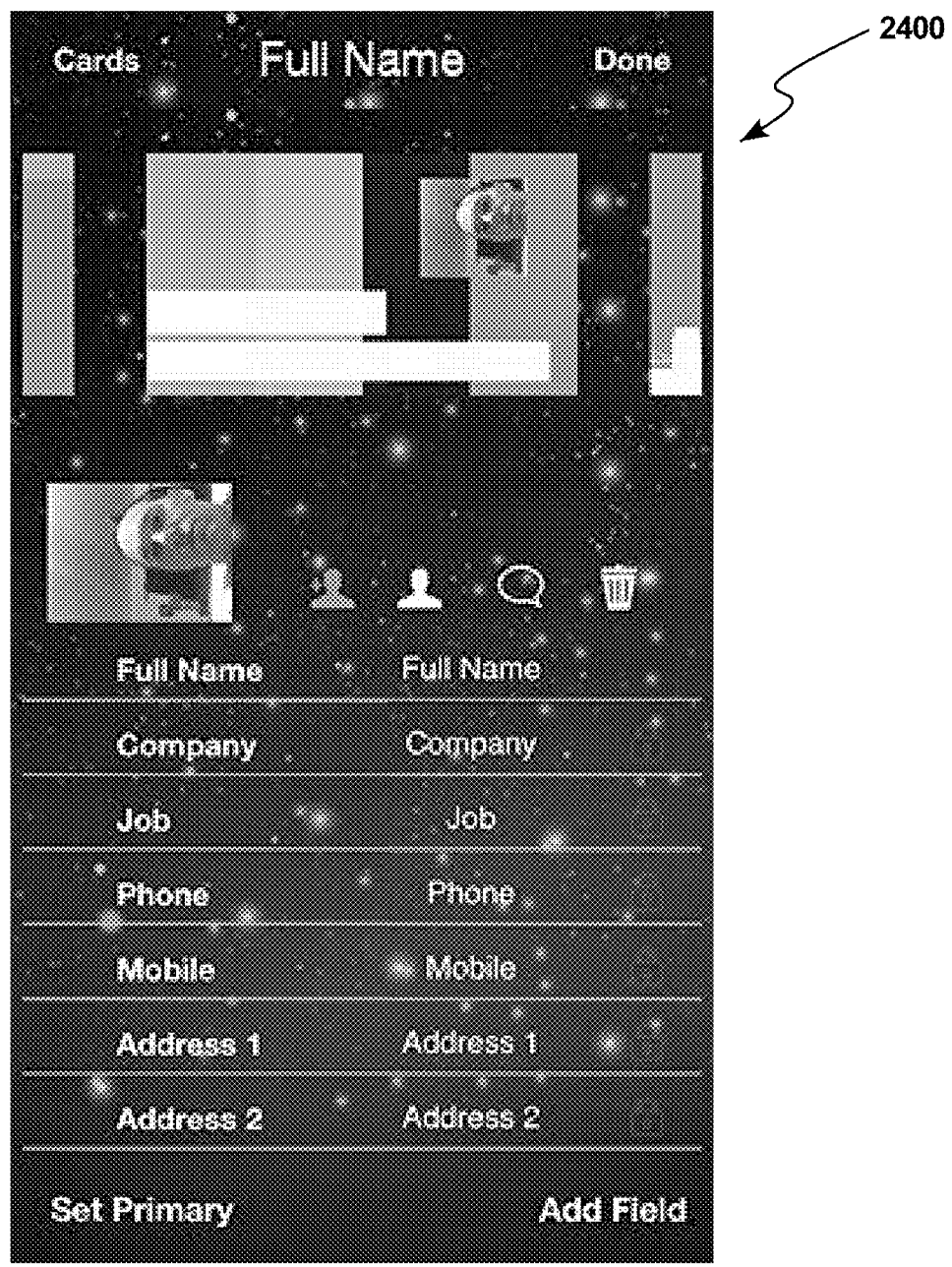
FIG. 24 illustrates an embodiment according to the present disclosure.

According to some embodiments, FIG. 24 illustrates a screen depiction 2400 allowing the user to preview one or more cards with an embedded video.

Figure 25:
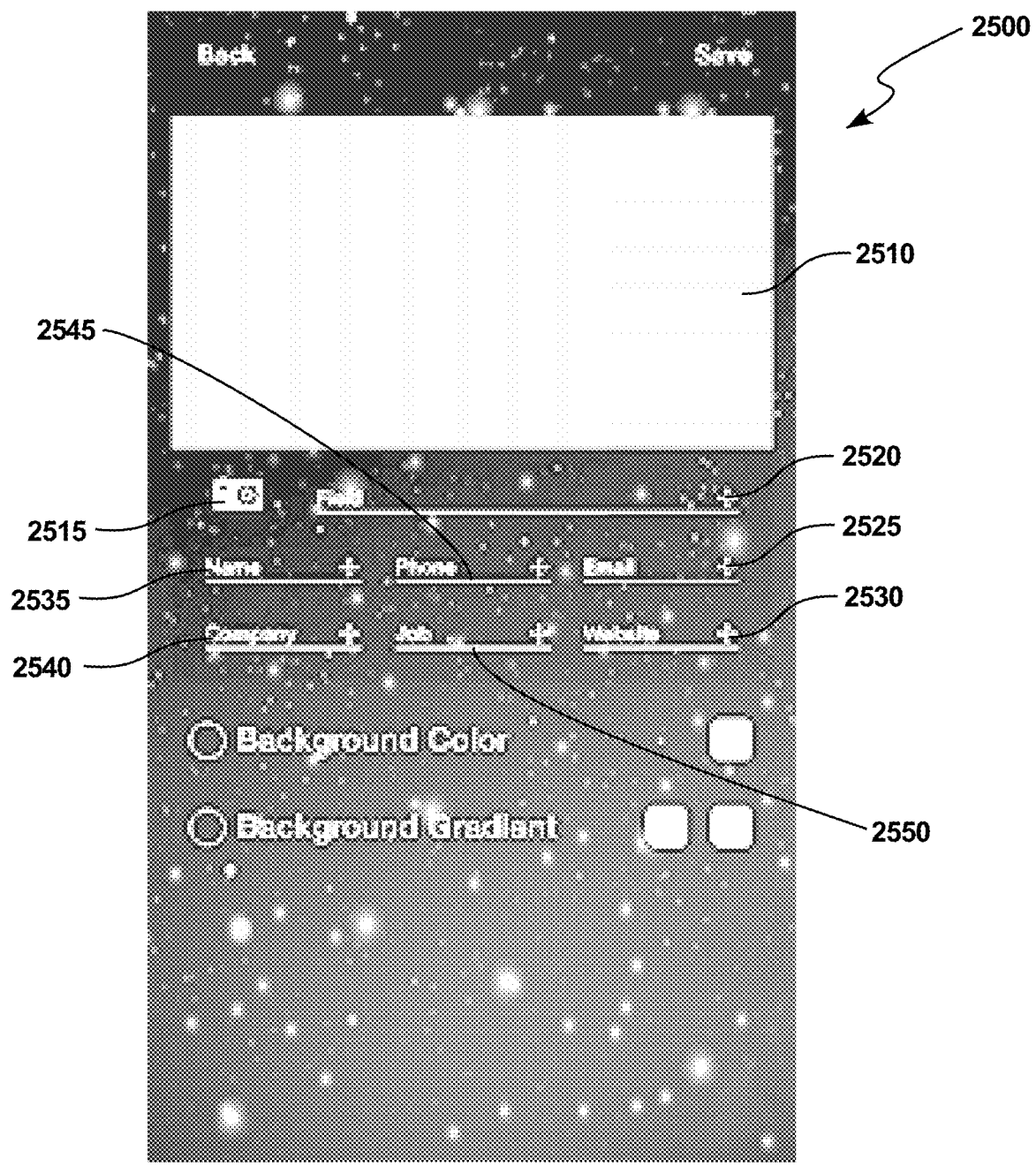
FIG. 25 illustrates an embodiment according to the present disclosure.

According to some embodiments, FIG. 25 illustrates a screen depiction 2500 with a blank card 2510 to allow the user to create a custom card by dragging and/or selecting one or more fields 2515-2550 onto the blank card 2510.

According to some embodiments, selecting filed 2515 allows the user to include a photograph, a video and/or logo in the blank card 2510. According to some embodiments, selecting filed 2515 allows the user to access a video and/or logo stored on the device 5110. According to some embodiments, selecting filed 2515 allows the user to take a new photograph or a new video and include the new photograph or the new video in the blank card 2510. According to some embodiments, the user is allowed to adjust the dimensions and position of the video, photograph and/or logo positioned on the blank card 2510.

Figure 26:
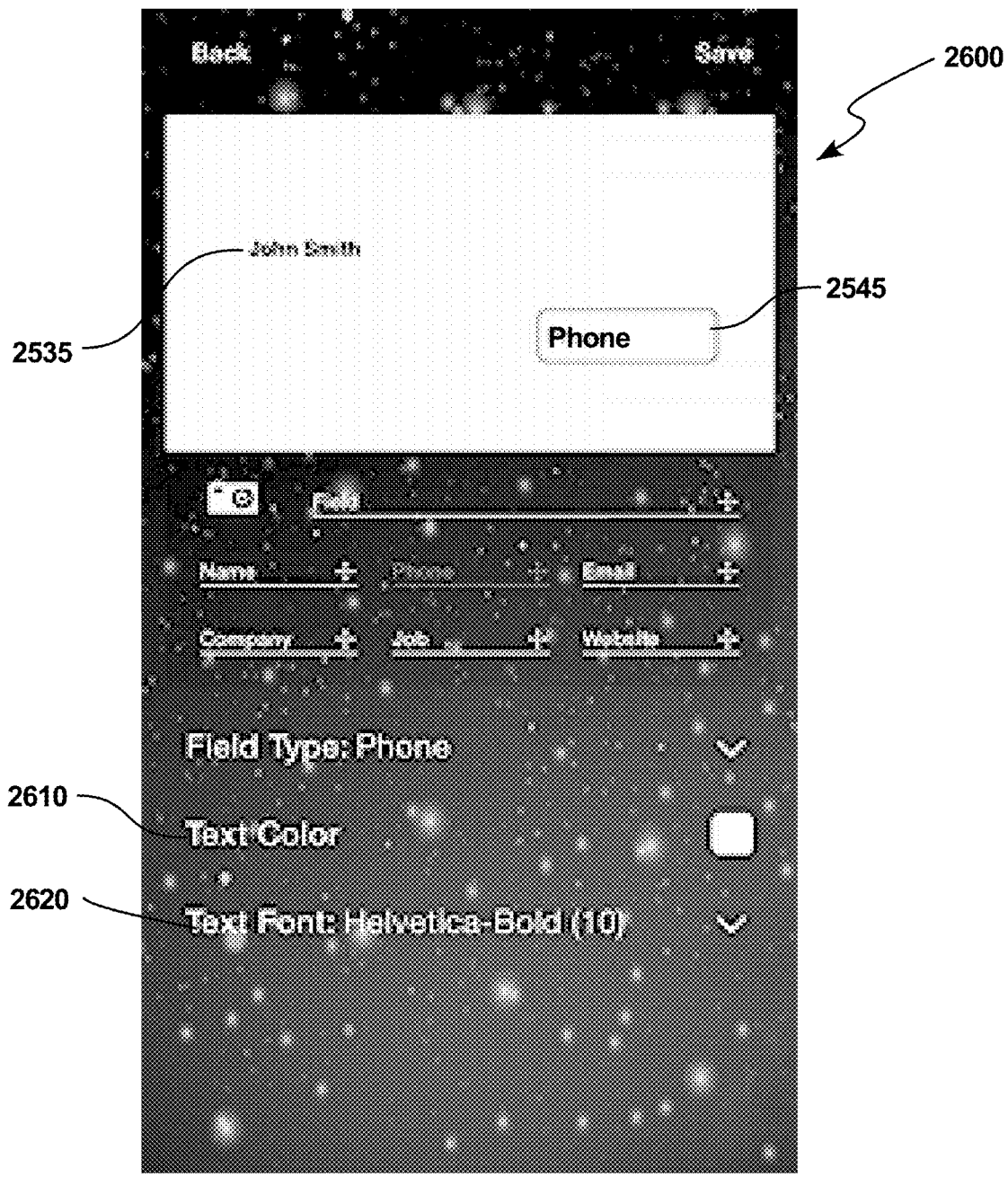
FIG. 26 illustrates an embodiment according to the present disclosure.

According to some embodiments, selecting filed 2535 allows the user to include a person's name in the blank card 2510 as shown in FIG. 26. According to some embodiments, selecting filed 2535 allows the user to access contacts stored on the device 5110 and include one of the contacts in the blank card 2510 as shown in FIG. 26. According to some embodiments, selecting filed 2535 allows the user to position an empty field in the blank card 2510 and type a person's name into that empty filed. According to some embodiments, the user is allowed to adjust the dimensions and position of the fields positioned on the blank card 2510.

According to some embodiments, selecting filed 2540 allows the user to include a company information in the blank card 2510. According to some embodiments, selecting filed 2540 allows the user to access contacts stored on the device 5110 and include one of the contacts in the blank card 2510. According to some embodiments, selecting filed 2540 allows the user to position an empty field in the blank card 2510 and type a company's information into that empty filed. According to some embodiments, the user is allowed to adjust the dimensions and position of the fields positioned on the blank card 2510.

According to some embodiments, selecting filed 2545 allows the user to include a phone number in the blank card 2510 as shown in FIG. 26. According to some embodiments, selecting filed 2545 allows the user to access contacts stored on the device 5110 and include one of the phone numbers in the blank card 2510 as shown in FIG. 26. According to some embodiments, selecting filed 2545 allows the user to position an empty field in the blank card 2510 and type a phone number into that empty filed. According to some embodiments, the user is allowed to adjust the dimensions and position of the fields positioned on the blank card 2510.

According to some embodiments, selecting filed 2550 allows the user to include a job description information in the blank card 2510. According to some embodiments, selecting filed 2550 allows the user to position an empty field in the blank card 2510 and type a job description into that empty filed. According to some embodiments, the user is allowed to adjust the dimensions and position of the fields positioned on the blank card 2510.

According to some embodiments, selecting filed 2530 allows the user to include a website information in the blank card 2510. According to some embodiments, selecting filed 2550 allows the user to position an empty field in the blank card 2510 and type a website address into that empty filed. According to some embodiments, the user is allowed to adjust the dimensions and position of the fields positioned on the blank card 2510.

According to some embodiments, selecting filed 2525 allows the user to include an email information in the blank card 2510. According to some embodiments, selecting filed 2525 allows the user to access contacts stored on the device 5110 and include one of the emails in the blank card 2510. According to some embodiments, selecting filed 2525 allows the user to position an empty field in the blank card 2510 and type an email information into that empty filed. According to some embodiments, the user is allowed to adjust the dimensions and position of the fields positioned on the blank card 2510.

According to some embodiments, FIG. 26 illustrates a screen depiction 2600 depicting card 2510 with fields 2535 and 2545. According to some embodiments, the screen depiction 2600 allows the user to change color and/or font of the text using features 2610 and/or 2620.

Figure 27:
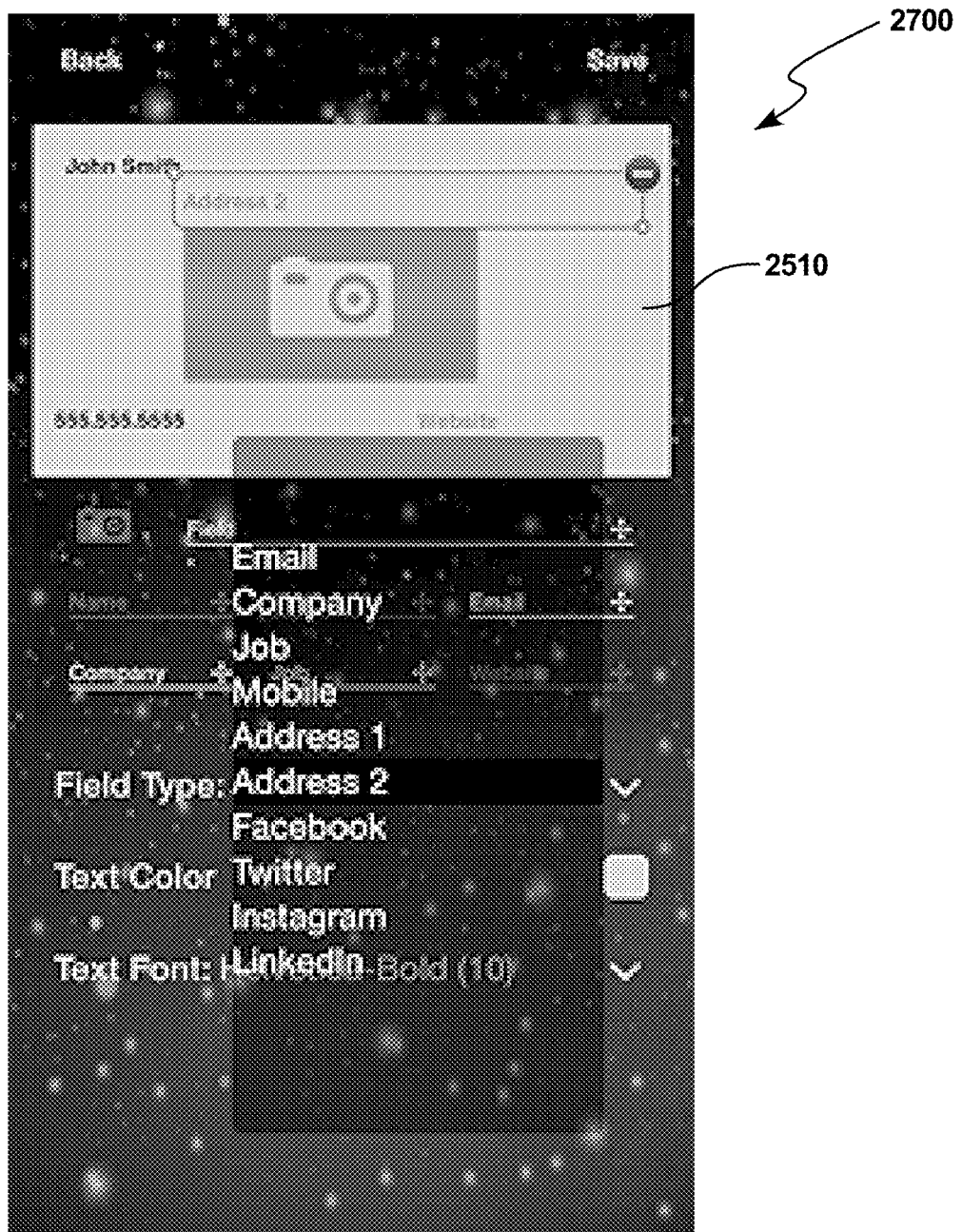
FIG. 27 illustrates an embodiment according to the present disclosure.

According to some embodiments, FIG. 27 illustrates a screen depiction 2700 allowing the user to create and name custom fields to be included in the card 2510. According to some embodiments, the user is allowed to adjust the dimensions of the one or more custom fields.

Figure 28:
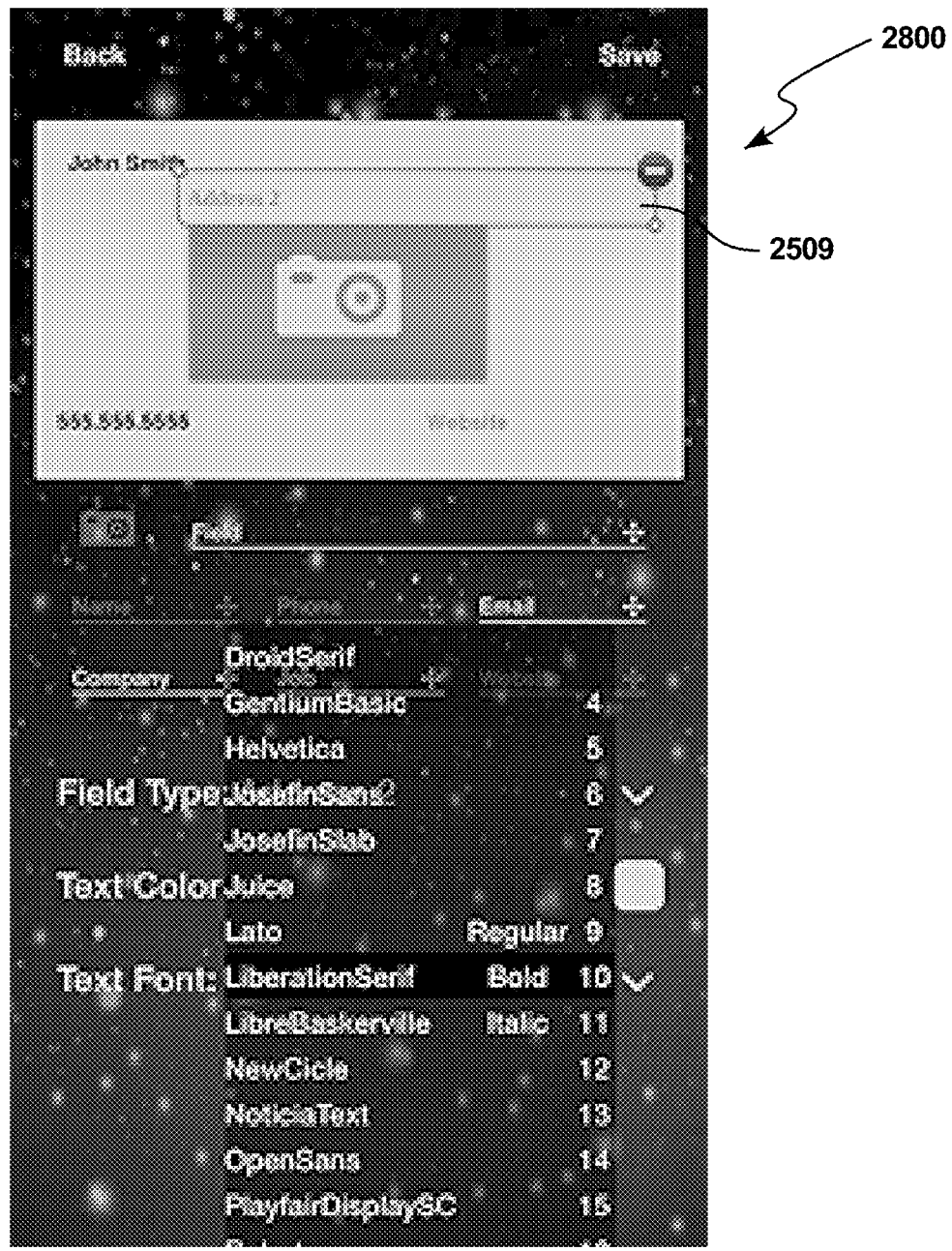
FIG. 28 illustrates an embodiment according to the present disclosure.

According to some embodiments, FIG. 28 illustrates a screen depiction 2800 allowing the user to change font of the text using the custom filed.

Figure 29:
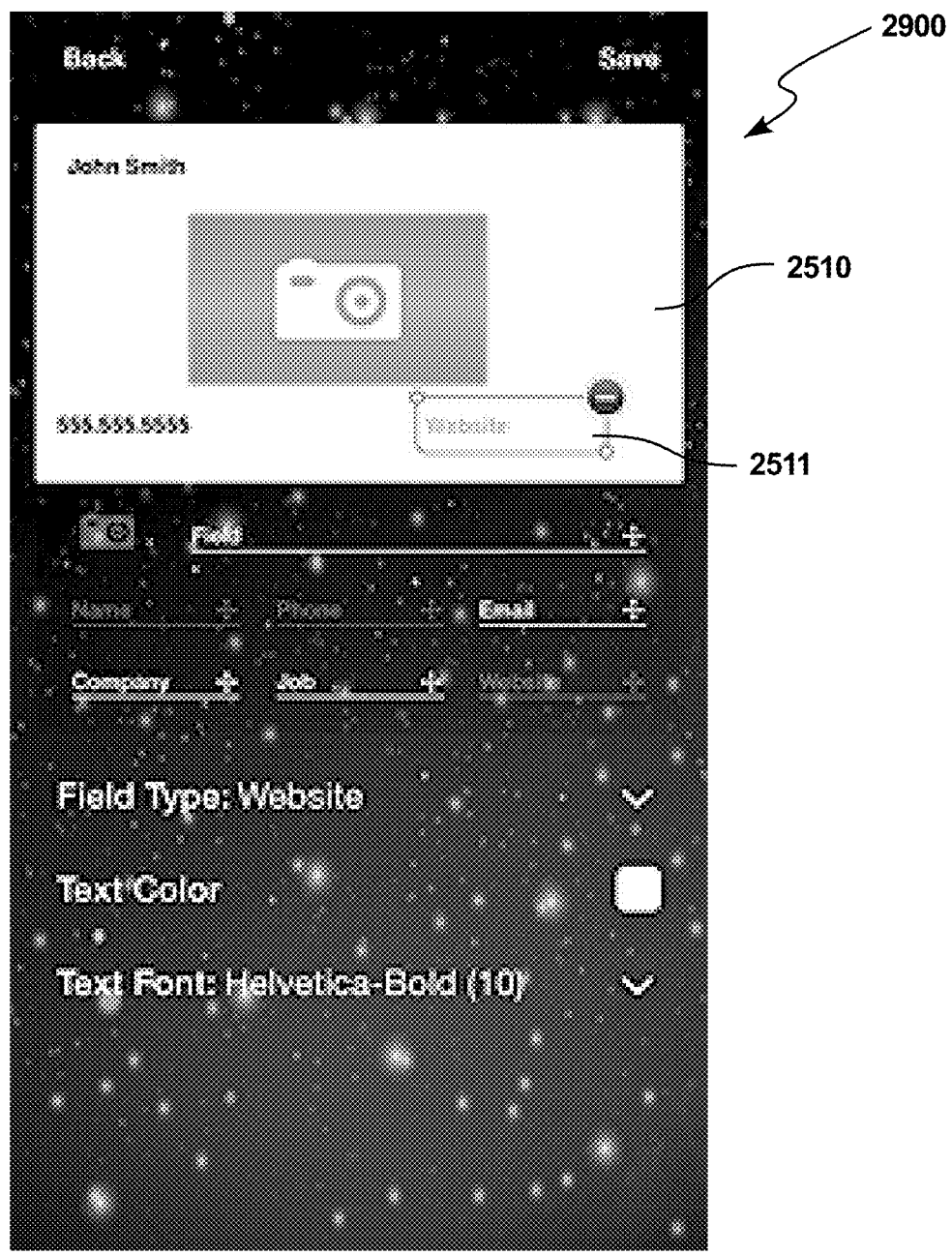
FIG. 29 illustrates an embodiment according to the present disclosure.

According to some embodiments, FIG. 29 illustrates a screen depiction 2900 allowing the user to change positions of the different fields on the card 2510 by, for example, dragging the fields from a first position 2509 (shown in FIG. 28) to a second position 2511 shown in FIG. 29.

Figure 30:
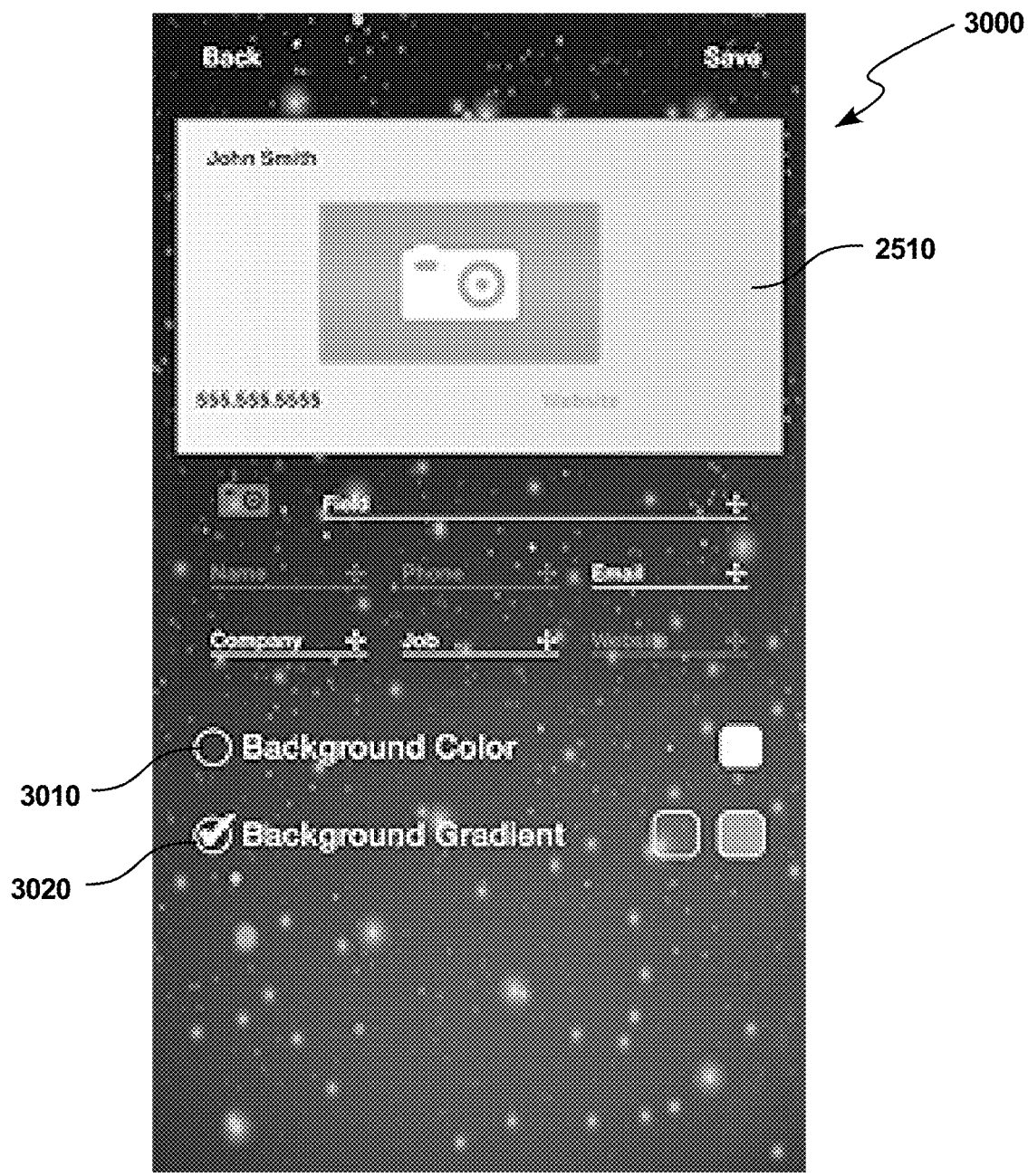
FIG. 30 illustrates an embodiment according to the present disclosure.

According to some embodiments, FIG. 30 illustrates a screen depiction 3000 allowing the user to change background color of the card 2510 using feature 3010 and/or allowing the user to change background gradient of the card 2510 using feature 3020.

Figure 31:
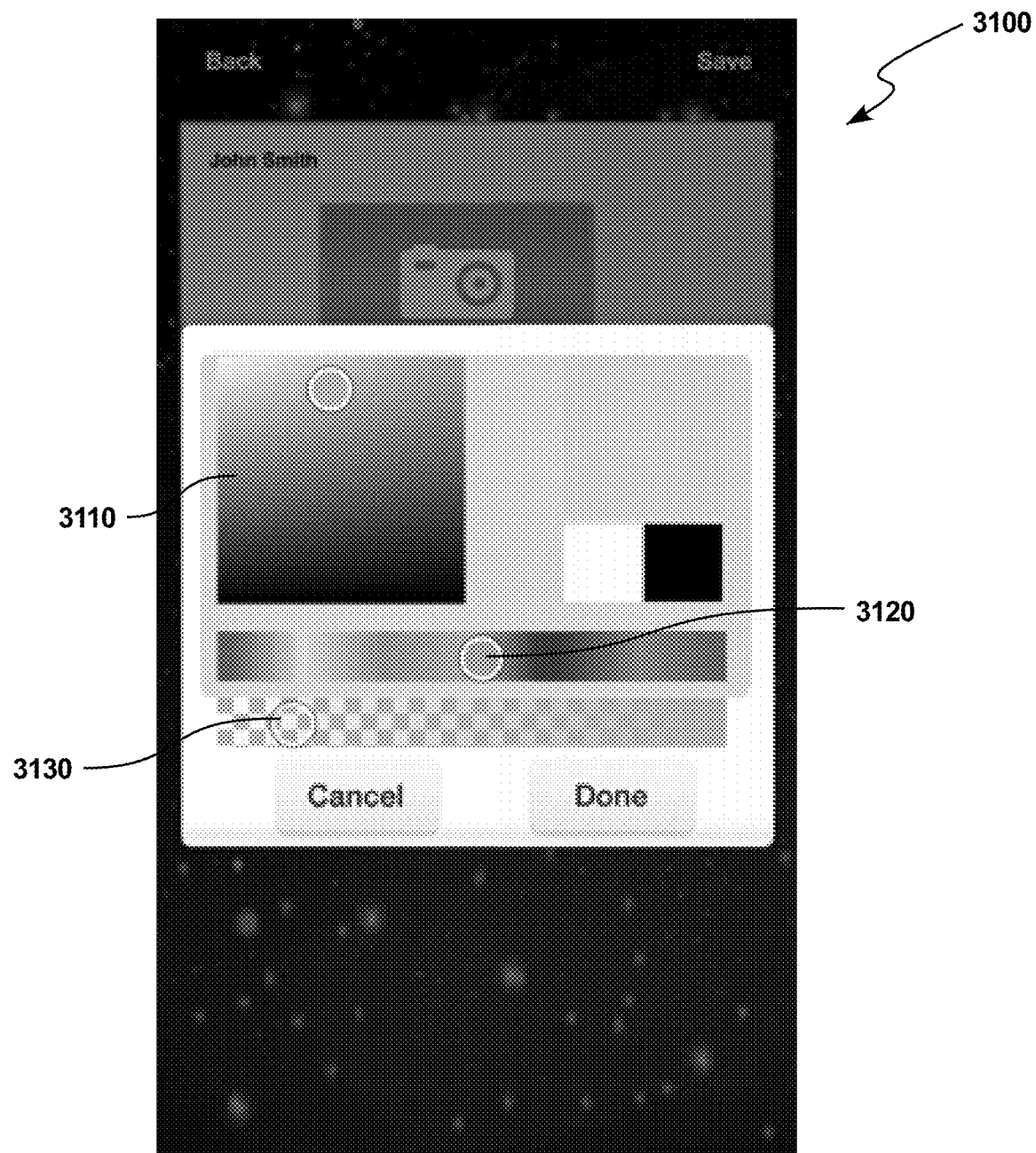
FIG. 31 illustrates an embodiment according to the present disclosure.

According to some embodiments, FIG. 31 illustrates a screen depiction 3100 allowing the user to change background color and/or background gradient by, for example, clicking and dragging color adjust feature 3110, and/or clicking and dragging color wheel 3120, and/or clicking and dragging gradient adjust feature 3130.

As used herein, the term "processor" broadly refers to and is not limited to a single- or multi-core central processing unit (CPU), a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features are described herein as being performed in a tablet computing device, the features described herein may also be implemented, mutatis mutandis, on a desktop computer, a laptop computer, a netbook, a cellular phone, a personal digital assistant (PDA), or any other appropriate type of tablet computing device or data processing device.

Although features and elements are described above in particular combinations, each feature or element can be used alone or in any combination with or without the other features and elements. For example, each feature or element as described above may be used alone without the other features and elements or in various combinations with or without other features and elements. Sub-elements of the methods and features described above may be performed in any arbitrary order (including concurrently), in any combination or sub-combination.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. A computer implemented method, comprising: at an electronic device with a touch-sensitive display,
   displaying a representation of a blank card on the touch-sensitive display;
   detecting user's first finger contact with the touch-sensitive display;
   in response to detecting the user's first finger contact, displaying a field on the representation of the blank card;
   detecting user's second finger contact with the touch-sensitive display;
   in response to detecting the user's second finger contact allowing the user to record and include a video in the field on the representation of the blank card;
   detecting user's third finger contact with the touch-sensitive display;
   in response to detecting the user's third finger contact allowing the user to adjust the dimensions of the field on the representation of the blank card;
   detecting user's fourth finger contact with the touch-sensitive display; and
   in response to detecting the user's fourth finger contact allowing the user to adjust the position of the field on the representation of the blank card.

2. The computer implemented method of claim 1 further comprising allowing the user to include a photograph in the blank card.

3. The computer implemented method of claim 1 further comprising allowing the user to include a logo in the blank card.

4. The computer implemented method of claim 1 further comprising allowing the user to include information in the blank card.

5. The computer implemented method of claim 4 wherein information is a name, phone number, address, email, or website address.

6. The computer implemented method of claim 1 wherein the representation of the blank card is a representation of a business card.

7. The computer implemented method of claim 1 further comprising:
   detecting user's fifth finger contact with the touch-sensitive display;
   in response to detecting the user's fifth finger contact, displaying another field on the representation of the blank card;
   detecting user's sixth finger contact with the touch-sensitive display;
   in response to detecting the user's sixth finger contact allowing the user to adjust the dimensions of the another field on the representation of the blank card;
   detecting user's seventh finger contact with the touch-sensitive display; and
   in response to detecting the user's seventh finger contact allowing the user to adjust the position of the another field on the representation of the blank card.

* * * * *